US 6,660,997 B2

(12) United States Patent
Laberge et al.

(10) Patent No.: US 6,660,997 B2
(45) Date of Patent: Dec. 9, 2003

(54) ABSOLUTE POSITION MOIRÉ TYPE ENCODER FOR USE IN A CONTROL SYSTEM

(75) Inventors: Michel Laberge, Bowen Island (CA); Thomas W. Steiner, Burnaby (CA); Valentin Karasyuk, Ottawa (CA)

(73) Assignee: Creo SRL, St. James (BB)

( * ) Notice: Subject to any disclaimer, the term of this patent is extended or adjusted under 35 U.S.C. 154(b) by 130 days.

(21) Appl. No.: 09/842,031

(22) Filed: Apr. 26, 2001

(65) Prior Publication Data

US 2002/0179826 A1 Dec. 5, 2002

(51) Int. Cl.[7] ................................................. G01D 5/34
(52) U.S. Cl. .................................. 250/231.18; 356/482
(58) Field of Search ...................... 250/231.13, 231.14, 250/231.16, 231.18, 578.1; 356/478, 482, 394, 396

(56) References Cited

U.S. PATENT DOCUMENTS

| | | |
|---|---|---|
| 3,689,162 A | 9/1972 | Ferguson |
| 3,957,378 A | 5/1976 | Zipin |
| 4,531,230 A | 7/1985 | Brogardh |
| 4,543,663 A | 9/1985 | Laor ........................... 455/600 |
| 4,564,295 A | 1/1986 | Halioua |
| 4,722,605 A | 2/1988 | Livnat et al. |
| 4,948,968 A * | 8/1990 | Matsui .................... 250/237 G |
| 4,950,891 A | 8/1990 | Matsui |
| 4,956,553 A | 9/1990 | Matsui |
| 5,075,562 A | 12/1991 | Greivenkamp, Jr. et al. |
| 5,274,229 A | 12/1993 | Khan |
| 5,576,537 A | 11/1996 | Holzapfel et al. ....... 250/237 G |
| 5,604,345 A | 2/1997 | Matsuura |
| 5,774,219 A | 6/1998 | Matsuura .................... 356/356 |
| 6,153,875 A * | 11/2000 | Villa et al. ............... 250/208.2 |
| 6,188,058 B1 | 2/2001 | Tullis ....................... 250/208.1 |

FOREIGN PATENT DOCUMENTS

| | | | |
|---|---|---|---|
| EP | 0718601 A2 | 6/1996 | |
| GB | 1380045 A | 1/1975 | |
| GB | 2183364 A | 6/1987 | |
| JP | 01107102 | 4/1989 | |
| JP | 11201721 | 7/1999 | |
| JP | 2000-241198 | * 9/2000 | ............ 250/231.14 |
| JP | 2000-275065 | * 10/2000 | ............ 250/231.14 |

OTHER PUBLICATIONS

Batlle, J. et al., *Recent Progress in Coded Structured Light as a Technique to Solve the Correspondence Problem: A Survey*, Jul. 31, 1998, pp. 963–982, vol. 31, No. 7.

* cited by examiner

*Primary Examiner*—Huy Mai
(74) *Attorney, Agent, or Firm*—Oyen Wiggs Green & Mutala

(57) ABSTRACT

A method and apparatus are disclosed for a two-dimensional Moiré type absolute position encoder and an associated control system. A reticle having a pattern variation in two orthogonal directions is illuminated with radiation from a source which is structured so as to create a two dimensional Moiré interference at the reticle. Radiation pulses from the radiation source are multiplexed in time and the resulting interference fringes are converted into electronic signals using a detector. A controller uses the electrical signals to determine the absolute position of the reticle in two dimensions to within the area of a particular cell. After determining the particular cell location, the controller also employs the signals from the groups of radiation stripes to calculate an accurate position of the reticle within the cell.

92 Claims, 15 Drawing Sheets

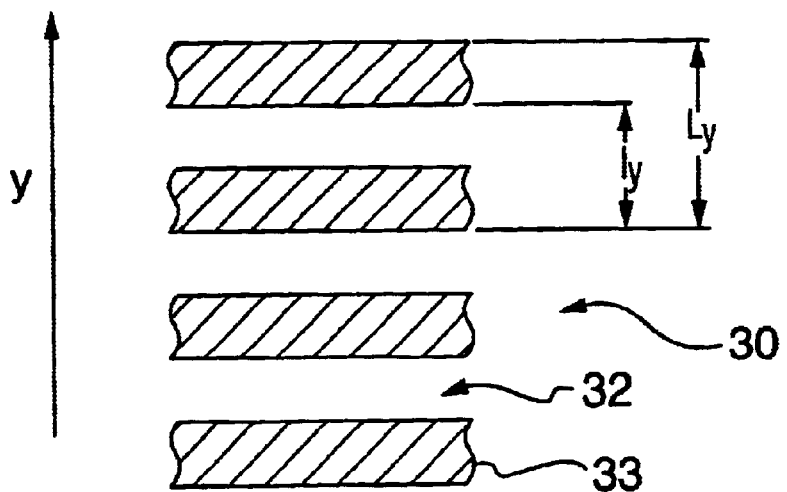
FIG. 2-A
PRIOR ART
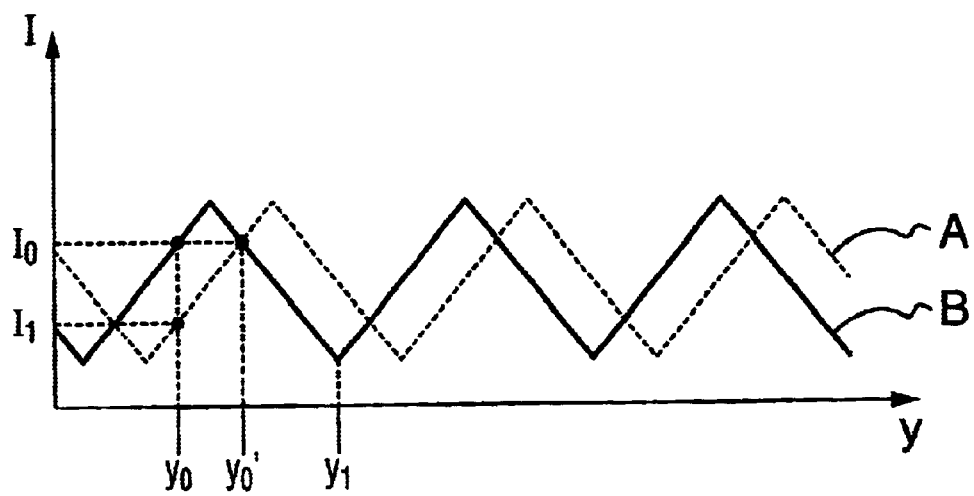
FIG. 2-B
PRIOR ART

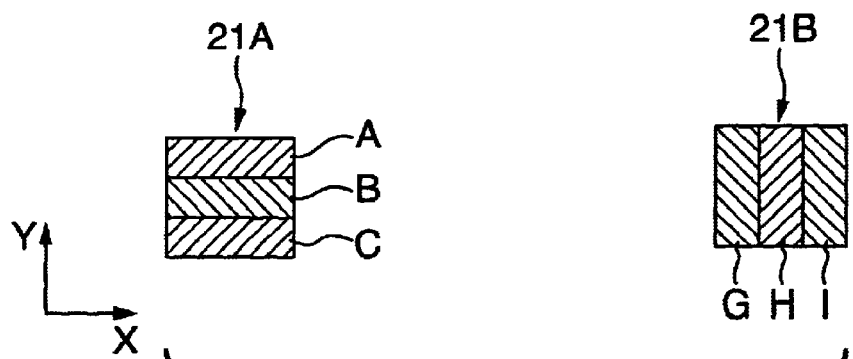
FIG. 12-A
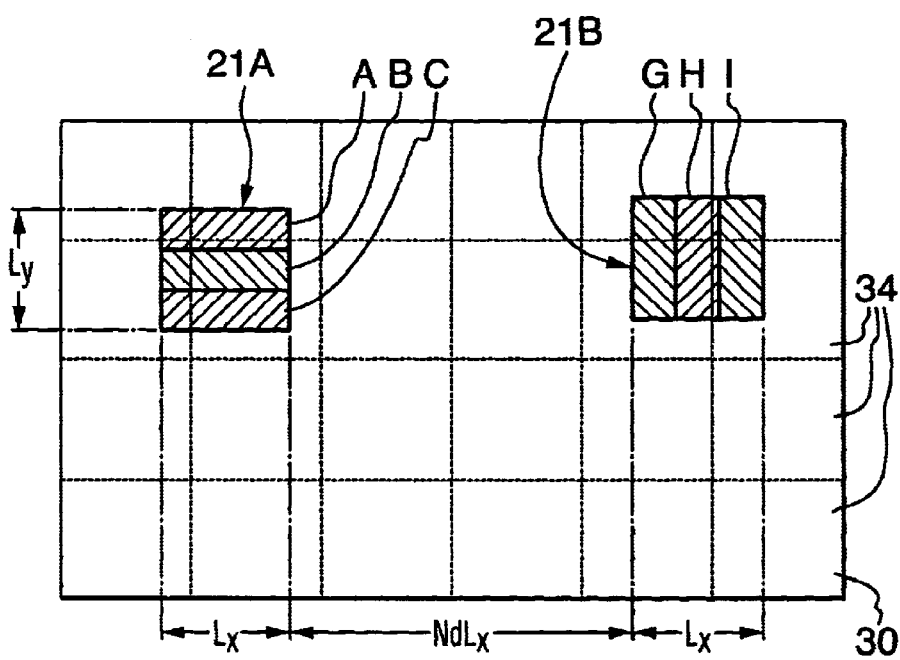
FIG. 12-B

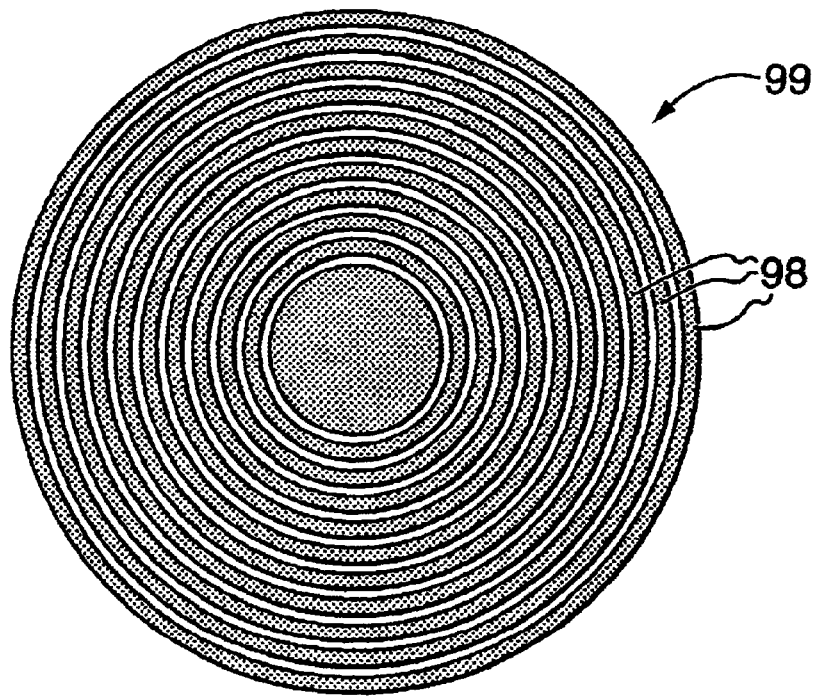
FIG. 17-A
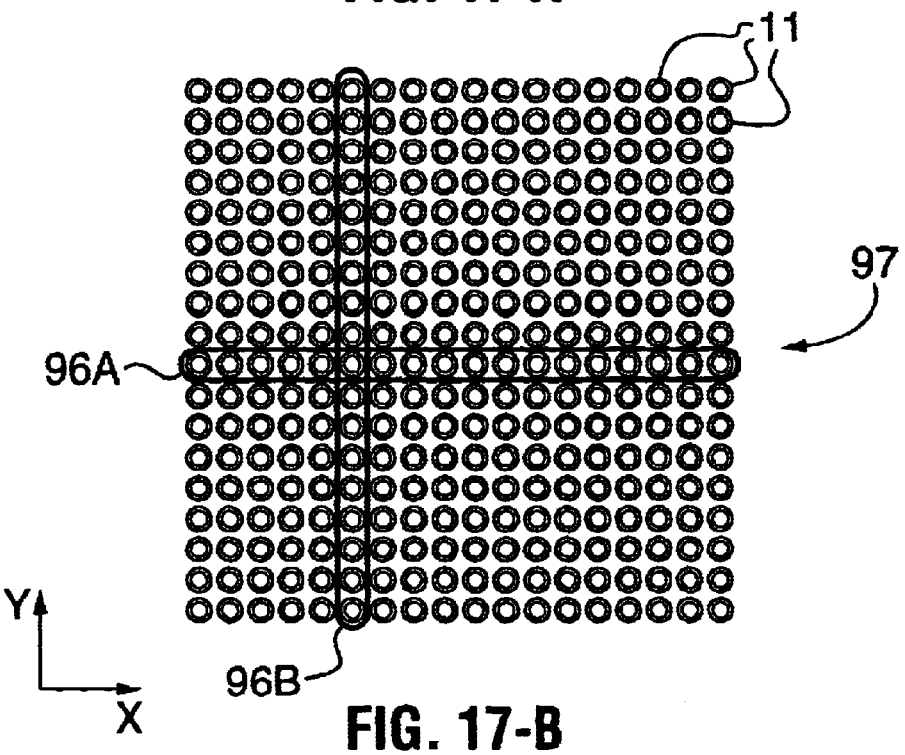
FIG. 17-B

ABSOLUTE POSITION MOIRÉ TYPE ENCODER FOR USE IN A CONTROL SYSTEM

FIELD OF THE INVENTION

The invention relates to optical encoders. Specifically, the invention relates to a Moiré type optical encoder for use in a control system.

BACKGROUND OF THE INVENTION

Incremental optical encoders are well known devices used to track the relative position and movement of an object along a particular track. Typical optical encoders include a light source that emits a light beam, a modulation means (usually a reticle or grating) for modulating the light beam as the object moves along the track, and a detector assembly for receiving the modulated light beams and converting the optical signal into an electrical signal. Multiple detectors may be used obtain two electrical signals that have a constant phase relationship. Together, the two electrical signals indicate both the change in location and the direction of movement of the object.

A specific type of optical encoder, known as a Moiré type encoder, uses two periodic gratings or reticles to modulate the incoming light signal. A typical Moiré encoder construction is depicted in FIG. 1. Referring to FIG. 1, the light source 21 illuminates the scanning reticle 20, generating a periodic radiation pattern. Light that permeates the scanning reticle 20 impinges on the object reticle 30 and light sensors 23 and 24 detect light transmitted through the object reticle 30. As the scanning reticle 20 and the object reticle 30 are translated with respect to one another along the axis indicated by arrows 31, the intensity pattern (not shown) at the surface of the sensors 23 and 24 varies periodically. This periodic variation of intensity, known as a Moiré pattern, is dependent on the spatial periodicity of the object reticle 30 and the scanning reticle 20. Conventionally, sensors 23 and 24 are positioned or oriented with respect to the object reticle 30 and to one another, such that the optical signals that they receive have a constant spatial phase difference of ¼ of the Moiré period. Since the optical signals received by the sensors 23 and 24 are phase shifted, the electrical signals (not shown) produced by the two sensors 23 and 24 are also phase-shifted from one another by ¼ period.

The functionality of a Moiré type encoder is shown in FIG. 2. FIG. 2-A shows a magnified view of a portion of an object reticle 30. The object reticle 30 has a periodic pattern of apertures 32 and opaque portions 33 extending in the y direction. The period (or pitch) of the object reticle 30 is labelled $L_y$. For ease of reference, the period $L_y$ of a reticle 30 is referred to throughout this application as the "pitch". Any one individual pitch $L_y$ including both the aperture 32 and the opaque area 33 is referred to in this application as a "cell" of the reticle. The quantity $l_y/L_y$ represents the fraction of a cell that is occupied by the aperture and is referred to throughout this application as the "aperture duty cycle".

As the object reticle 30 and the scanning reticle 20 (see FIG. 1) are scanned in the y direction relative to one another, an optical signal is received at each of the two sensors 23 and 24. The signals A and B of FIG. 2-B are idealized representations of the signals produced on sensors 23 and 24 respectively. The plot of signals A and B depicted in FIG. 2-B shows the variation of light intensity measured on the sensors 23 and 24 as a function of the relative movement between the object reticle 30 and the scanning reticle 20 in the y direction. It will be appreciated from the plot in FIG. 2-B, that signals A and B are phase separated by ¼ period.

Assuming an intensity of $I_o$ is measured on signal B, the relative position of the object reticle 30 could be $y_o$ or $y_o'$. As a result, typical Moiré encoders measure a second signal A to distinguish between the two possible positions $y_o$ and $y_o'$. For example, if signal B is measured at $I_o$ and signal A is measured at $I_1$, then the system knows that the correct position is yo rather than $y_o'$. In most circumstances, a Moiré system can determine the direction of relative motion by measuring either one of signals A or B. For example, if $y_o$ is the start position, then movement in one direction will cause an increase in the intensity of signal B and movement in the other direction will cause a decrease in the intensity of signal B. Hence, if an increase or decrease in the intensity of signal B is detected, then the direction of motion is known. In some circumstances, however, signal B will be at or near a zero derivative point (i.e. at a maximum or minimum of the signals, such as $y_1$, which is a minimum of signal B). In such a situation, both directions of movement will produce similarly increasing intensity profiles for signal B. Signal B is said to be "indeterminate" as to direction; consequently, signal A must be used to determine the direction of motion. With two signals (A and B) differing in phase by a known phase difference, such as ¼ of the Moiré period, at least one signal will always be determinative of the direction of motion.

The principal drawback with incremental encoders, such as the one described above, is that they are only useful for determining relative position and movement. That is, they are only able to determine the position and movement of an object relative to a fixed or predetermined reference position. Often, the reference position used is the start position of the device when the encoder is powered up. Other techniques for obtaining a reference position include using an index signal that alerts the encoder system when the object is at a particular position along its track. This requires that, upon "wake-up", the encoder searches its track for the index signal, before it is able to locate itself. The dependence of incremental encoders on a reference position is an obvious drawback in some applications, where the start position may not be suitable for a reference, where the provision of an index signal is inconvenient or impossible, or where the time required to locate an index signal is not available.

Some optical position encoders, which do not rely on a reference position are known in the art and are referred to as "absolute position" encoders. A typical implementation for an absolute position encoder is depicted in FIG. 3. The encoder includes a light source 11, such as an LED, for emitting light $L_a$ and a collimating lens 12 to produce collimated light $L_b$. A first scale 13 is a specialized grating with a number of grating tracks ($t_1, t_2, \ldots t_n$), each track including apertures 13A and opaque sections 13B. For each track ($t_1, t_2, \ldots t_n$), the apertures 13A and the opaque sections 13B alternate periodically. However, although the aperture duty cycle is constant for each track ($t_1, t_2, \ldots t_n$), the pitch of each track ($t_1, t_2, \ldots t_n$) is different. A second scale 14 is provided with apertures ($14 A_1, 14A_2 \ldots 14A_n$) arranged behind the respective grating tracks ($t_1, t_2, \ldots t_n$). The arrangement of the second scale 14 is such that light transmitted through the apertures 13A of the first scale 13 is able to pass through the apertures ($14A_1, 14A_2 \ldots 14A_n$). Photodetectors (15-1, 15-2, ... 15-n) are positioned strategically with respect to the apertures ($14A_1, 14A_2 \ldots 14A_n$), so as to convert the light beams passing through the apertures ($14A_1, 14A_2 \ldots 14A_n$) into electrical signals.

Typically, the prior art absolute position encoders use a first scale 13, which is provided with binary "Gray codes" as shown in FIG. 4, wherein grating pitches ($P_1, P_2, \ldots P_n$) between adjacent grating tracks ($t_1, t_2, \ldots t_n$) have a ratio of 1:2. Consequently, the intensities of the light beams ($L_{e1}, L_{e2}, \ldots L_{en}$) received by the respective photodetectors (15-1, 15-2, . . . 15-n) change periodically when the first scale 13 moves in a longitudinal direction (marked by arrow m). Similarly, the electrical signals ($S_1, S_2, \ldots S_n$) produced by photodetectors (15-1, 15-2, . . . 15-n) also change periodically as is depicted in the graph of FIG. 5. FIG. 5 depicts the electrical signals ($S_1, S_2, \ldots S_n$) on the vertical axis as a function of displacement along the longitudinal axis (marked by arrow m) on the horizontal axis. FIG. 6 then shows a block diagram of how the electrical signals ($S_1, S_2, \ldots S_n$) are digitized by individual comparators 50 into digital signals ($d_1, d_2, \ldots d_n$) and further converted from the binary Gray codes into an absolute positional data D by the decoder 51. The absolute position data D could be a simple binary code, a BCD code or some other representative scheme.

One drawback with this type of encoder that employs a Gray code or similar encoding scheme is that the resolutional detection is limited by the grating pitch $P_a$ in the track $t_a$. Detection of smaller increments is impossible. Also, the detection stroke or largest measurements that can be made are limited to the order of the grating pitch $P_1$ in track $t_1$. Any attempt to expand the performance to facilitate larger or smaller positional measurements increases the number of grating tracks, thereby increasing the size of the device and the number of components such as photodetectors and comparators obviously, increasing the size of the encoder and increasing the number of components to achieve a larger measurement range limits its possible design applications and increases the cost and complexity of the device.

A second limitation of this type of encoder that employs a Gray code or similar encoding scheme is the impracticality of expanding it to function as a two dimensional encoder. As depicted in FIG. 3 above, measurement of a particular dimension requires a first scale 13 with a large number of grating tracks ($t_1, t_2, \ldots t_n$), which extend in a second orthogonal dimension. As mentioned above, any attempt to expand the performance to facilitate larger or smaller positional measurements increases the number of grating tracks, thereby increasing the size of the device in the second orthogonal dimension. Because of the increase in size on the second orthogonal dimension, this size issue becomes even more of an impediment when the device is used to attempt to implement a two dimensional encoder. Clearly, the expansion in size presents extra difficulties to design applications when trying to use this type of encoder to measure absolute position in two dimensions.

Other types of absolute position encoders that depend on diffraction and the wave nature of light are known in the art. Such encoders utilize a grating with a varying pitch to produce a number of diffracted orders. A plurality of detectors convert the intensity of the diffracted orders into electronic signals for analysis and extraction of positional information. The need to detect a number of diffracted orders individually and the corresponding space occupied would make it difficult to extend the system to a two dimensional case. As a result, these types of encoders may not be suitable for implementation in some applications, particularly where space is at a premium.

In the field of three-dimensional Moiré shape analysis or Moiré topography there are several disclosures of systems which project a grid pattern onto an object to be inspected and create a Moiré interference between the light reflected from the object and a second reference grid. In these inventions the concern is primarily with determining a deflection or the topography of an object where the motion or information to be determined is substantially in the direction of the projected beam and hence not useful for use in a two-dimensional encoder.

There is a need for an optical encoder that ameliorates at least some of the disadvantages of the prior art systems mentioned above.

SUMMARY OF THE INVENTION

In accordance with the present invention a structured radiation source is used to project a pattern on a surface or reticle which is also patterned. The patterns are selected to vary in some manner which enables an absolute position to be determined by detecting the changes in the radiation pattern either reflected from or transmitted through the surface.

The patterning can be in the form of a plurality of cells which have either transmitting and non-transmitting or reflecting and non-reflecting portions. Advantageously the surface or reticle can be made up of a grid of lines varying in thickness while maintaining a fixed pitch or spacing in two-dimensions.

There are also certain advantages, as will be described in the preferred embodiment, in using reticles with concentric circles, or a grid where lines in different orthogonal directions have sensitivity to different wavelength or polarization of radiation .

Advantageously the radiation source can be realized through a plurality of individual radiation sources which can be driven to project patterns onto the reticle. A convenient radiation source is a radiation emitting diode or light emitting diode.

The radiation source may comprise a matrix of radiation emitting devices which can be driven to produce lines of radiation in two orthogonal directions.

The radiation sources are projected using a lens or some other means onto the reticle surface where the Moiré interference is generated and detected by a radiation sensitive device which could be a photodetector or even a CCD sensor.

Multiple encoder units can be constructed for each radiation source which allows the running of many such encoders in parallel while minimizing the space required to house the devices.

Through careful choice of the geometry of the radiation sources, it is possible to implement a method of measuring position in two places on the reticle and then determining a rotation angle which may be necessary for achieving the best accuracy of position encoding.

This invention is also particularly suited to an application, such as a control system, where it is necessary to servo a position in two dimensions employing the encoder to measure the actual position.

These and other objects of the present invention will be better understood from the following more detailed description along with the drawings and the accompanying claims.

BRIEF DESCRIPTION OF THE DRAWINGS

FIG. 2-A depicts a magnified view of a part of a prior art linear object reticle, showing its pitch and duty cycle.

FIG. 2-B depicts a plot of the phase offset signals received at the photodetectors of a prior art Moiré type optical encoder.

FIG. 12-A depicts the radiation banks in a simplified embodiment of the invention useful for explaining the concept of the invention.

FIG. 12-B depicts the image of the radiation banks in the simplified embodiment of the invention as they appear on the object reticle.

FIG. 17-A depicts an alternative embodiment of a reticle utilizing concentric circles.

FIG. 17-B depicts an embodiment of the radiation bank which may be used in conjunction with the reticle of FIG. 17-A.

DESCRIPTION OF THE PREFERRED EMBODIMENT

As the apparatus and method envisaged by the present invention may be most easily understood by considering the invention's constituent components, the disclosure is divided into the following sections: (1) encoder architecture and components; (2) the object reticle; (3) radiation banks, radiation stripes and phase signals; (4) phase normalization; (5) calculation of coarse position and fine position; (6) two-dimensional position control system; and (7) alternative embodiments and improvements.

Encoder Architecture and Components

Figure 7:
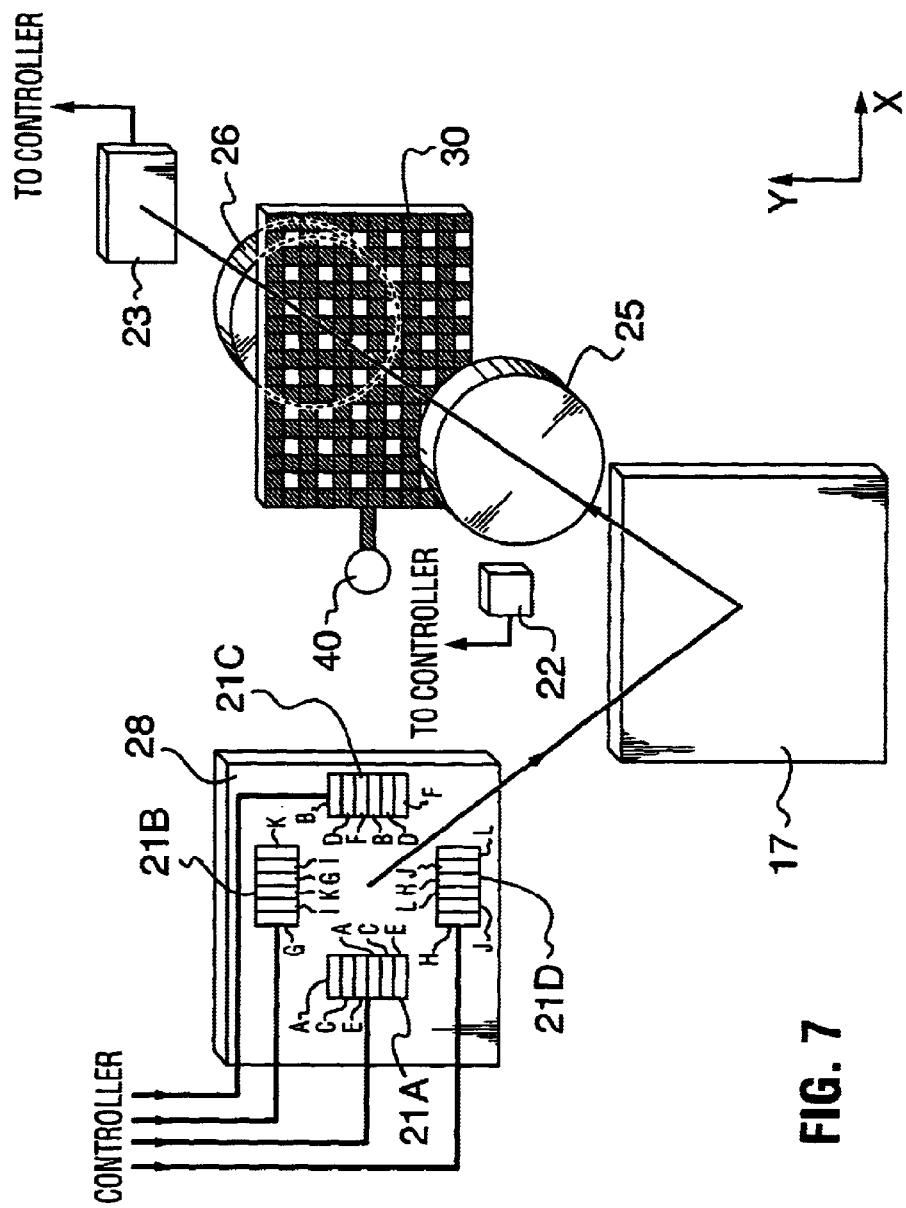
FIG. 7 is a schematic illustration of a preferred embodiment of a two-dimensional Moiré type absolute position encoder in accordance with the present invention.

FIG. 7 depicts the preferred embodiment of an absolute position encoder in accordance with the present invention.

The invention comprises a plurality of strategically arranged radiation banks (21-A, 21-B, 21-C and 21-D) affixed to a mounting unit 28. In general, only two radiation banks are required to determine absolute position. However, as will be discussed below, the addition of extra radiation banks can be used to measure rotation and to improve the performance of the device. The preferred embodiment has four radiation banks (21-A, 21-B, 21-C and 21-D). Each radiation bank (21-A, 21-B, 21-C and 21-D) contains a plurality of radiation stripes. Spatially periodic groups of radiation stripes (A through L) within the radiation banks (21-A, 21-B, 21-C and 21-D) are pulsed to emit radiation, which is reflected by bending mirror 17 and then imaged onto the reticle 30 by optical system 25. For example, radiation bank 21-A of FIG. 7 includes a spatially periodic group of radiation stripes A which includes two individual radiation stripes. All of the individual radiation stripes within group A are pulsed simultaneously. The pulses from the various groups of radiation stripes (A though L) are referred to in this disclosure as "phases" (A through L)

After optical system 25 images the radiation from the various phases (A through L) onto the object reticle 30, optical system 26 collects any radiation transmitted through the reticle 30 and directs it onto the surface of a radiation sensor 23. Although the reticle 30 is shown in FIG. 7 as a transmitting or transmissive element, reticle 30 may also be embodied as a reflective element in which case radiation sensor 23 would be disposed to collect the radiation reflected from the reticle 30 rather than the radiation transmitted through the reticle.

It should be noted here that the radiation detector 23 is chosen to correspond to (i.e. be sensitive to) the radiation emitted by the radiation banks (21-A, 21-B, 21-C and 21-D). Radiation detector 23 could be a photodetector, CCD array or any other sensor suitable for use at the radiation wavelength and levels chosen in a particular embodiment.

It should also be noted here, that FIG. 7 schematically depicts the optical systems 25 and 26 as simple lenses, but this implementation is not a requirement. In addition, mirror 17 is shown as a simple flat folding mirror. In general, optical systems 25 and 26 and mirror 17 may comprise any number of optical elements of any type. The folding mirror 17 is commonly used to reduce the space requirement of an optical system by "folding" the apparatus to occupy a smaller footprint. However the mirror 17 could also be moveable and the motion that the encoder is required to detect could be associated with the element 17. A system consistent with the principles of the present invention may use multiple bending mirrors or it may not use any mirrors, provided that radiation banks (21-A, 21-B, 21-C and 21-D) are imaged onto reticle 30. Furthermore, optical system 26 is not a general requirement. It is desirable to maximize the amount of light transmitted through reticle 30 that impinges on photodetector 23. In some embodiments, the geometry may be such that there is no need for optical system 26 in order to achieve this goal. It should also be mentioned at this stage of the disclosure, that there is no general requirement that radiation emitted by the radiation banks (21-A, 21-B, 21-C and 21-D) must be within the visible spectrum; consequently, any reference to "radiation" or "light" in this disclosure should be understood to encompass electromagnetic radiation of any wavelength.

As explained further below, the interaction of the projected images of the spatially periodic phases (A through L) on the surface of the reticle 30 creates a Moiré pattern similar to that of the interaction between the object and scanning reticles of prior art encoders. Measurement of the intensities of the phases (A through L) may facilitate calculation of the absolute position of the reticle 30 in two dimensions. Typically, an object of interest 40 is affixed to the object reticle 30; consequently, calculating the position of the object reticle 30 is equivalent to determining the position of the object 40. In the embodiment depicted in FIG. 7, the object 40 being tracked is smaller than the object reticle 30, but this is not a requirement and, in general, the object 40 may be of any size. The object 40 may be freely translatable on the two-dimensional surface defined by the x and y axes of FIG. 7. In a variation on this embodiment the reticle 30 could be stationary and mirror 17 could be made to be a moveable element. Likewise both the mirror 17 and the reticle 30 could be held stationary and the radiation bank mount 28 be allowed to move. In an alternative embodiment it is possible for mirror 17 to be a Micro-Electro-Mechanical-Systems or MEMS type mirror or device.

Although generally undesirable, the encoder described in this invention is also capable of measuring a small amount of rotation of the object 40 and the attached reticle 30 about the axis substantially perpendicular to the reticle 30. Typically, such rotation is an unwanted effect resulting from inexact fabrication or degradation of the device with frequent usage over time.

The Object Reticle

Figure 8:
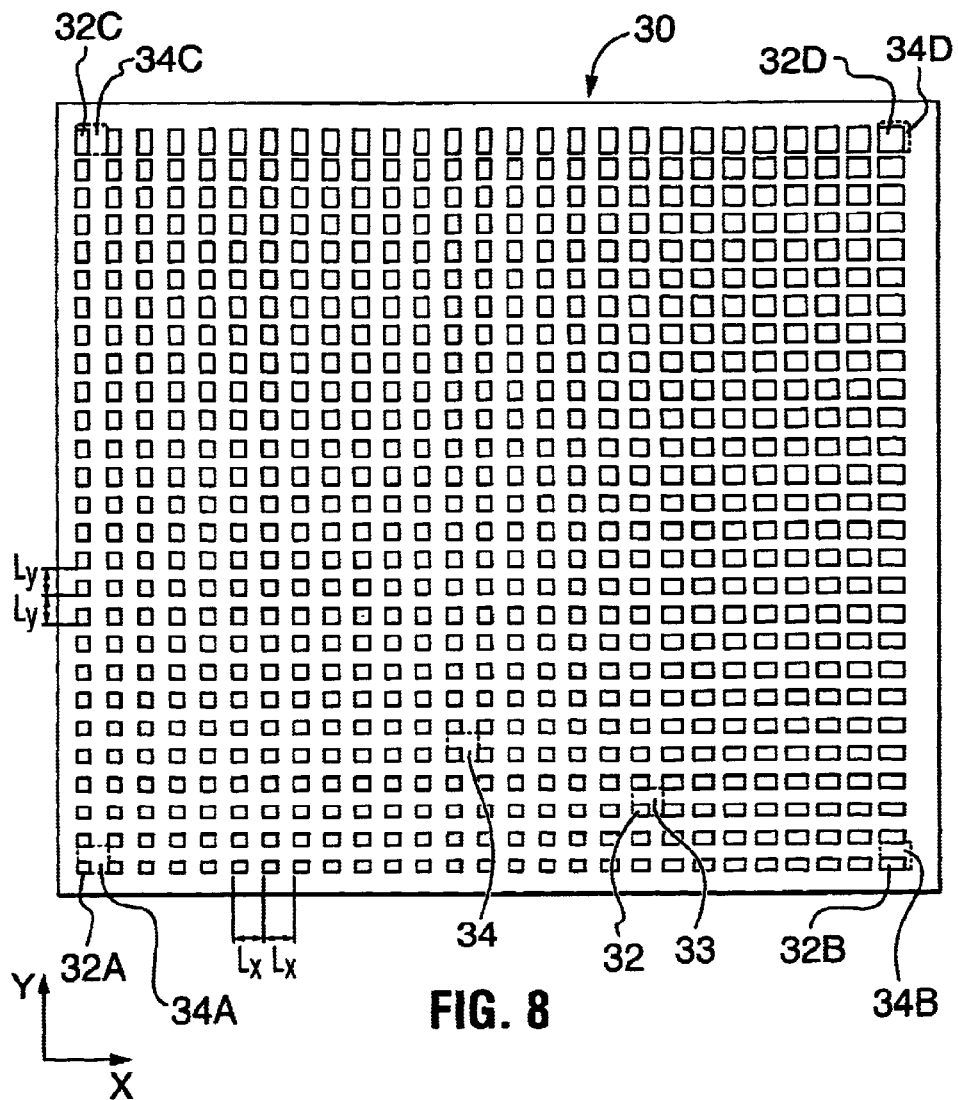
FIG. 8 shows the object reticle in accordance with the present invention with a constant pitch in each dimension and a variable aperture duty cycle.

FIG. 8 depicts a preferred embodiment of the object reticle 30 in accordance with the present invention. The object reticle 30 is a two-dimensional reticle with axes labelled x and y. All of the cells 34 in the two-dimensional reticle 30 have a length $L_x$ on the x-axis (referred to herein as the "pitch in the x direction") and a length $L_y$ on the y-axis (referred to herein as the "pitch in the y direction"). The cellular pitches $L_x$ and $L_y$ in each dimension are constant for every cell 34 in the reticle 30. Despite the constant pitches $L_x$ and $L_y$, the aperture duty cycle of the reticle 30 varies along each of the x and y axes. This variation of the aperture duty cycle can be observed from FIG. 8, where cell 34-A can be seen to have a significantly lower aperture duty cycle than cell 34-D. In the preferred embodiment, the constant pitches $L_x$ and $L_y$ are both equal for ease of calculation, but this is not a requirement and the pitch of both dimensions may be different from one another, provided that they are both constant.

The encoder disclosed herein may determine the absolute position of the reticle 30 using two interrelated procedures. The first step relates to measuring the position of the reticle 30 to within the area of a particular cell and is referred to throughout this disclosure as determining the "coarse position". The second step relates to measuring the precise position of the reticle 30 within the known cell and is referred to throughout this disclosure as determining the "fine position".

Figure 9:
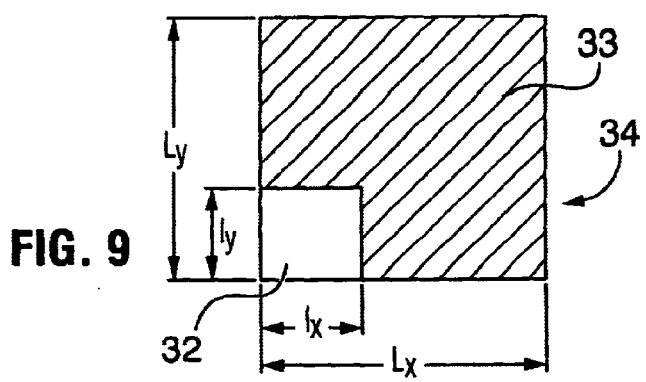
FIG. 9 shows a magnified view of a single cell of the object reticle.

FIG. 9 depicts a single cell 34 of the object reticle 30 in more particular detail. The pitches of the cell 34 in the x and y dimensions are $L_x$ and $L_y$ respectively and the cell 34 has an aperture 32 dimensioned $l_x$ by $l_y$. The opaque area 33 occupies the remainder of the cell 34. It should be noted that, for ease of discussion, FIG. 9 arbitrarily displays a cell 34 with the aperture 32 in the bottom left hand corner. It will be appreciated that this choice of cellular construction is not unique and that other cellular constructions can be envisaged, which have the properties of constant pitch and variable aperture duty cycle.

As mentioned above, the aperture duty cycle, defined by equation (1), varies throughout the reticle 30.

$$\text{aperture duty cycle} = (l_x l_y)/(L_x L_y) \tag{1}$$

Referring simultaneously to FIG. 8 and FIG. 9, the four corner cells (34-A, 34-B, 34-C and 34-D) of the object reticle 30 are labelled to demonstrate the variation of the aperture duty cycle. In cell 34-A, the aperture 32-A is dimensioned such that $l_x=(\frac{1}{3})L_x$ and $l_y=(\frac{1}{3})L_y$, yielding an aperture duty cycle of $\frac{1}{9}$. For the preferred embodiment, the aperture dimension $l_x$ is allowed to vary linearly along the x-axis of the reticle 30 from $l_x=(\frac{1}{3})L_x$ in cell 34-A to $l_x=(\frac{2}{3})L_x$ in cell 34-B. As a result, cell 34-B has an aperture duty cycle equal to $\frac{2}{9}$. Similarly, along the y-axis, the dimension $l_y$ varies linearly from $l_y=(\frac{1}{3})L_y$ in cell 34-A to $l_y=(\frac{2}{3})L_y$ in cell 34-C, yielding an aperture duty cycle of $\frac{2}{9}$ in cell 34-C. Finally, in cell 34-D, $l_x=(\frac{2}{3})L_x$ and $l_y=(\frac{2}{3})L_y$, for an aperture duty cycle of $\frac{4}{9}$.

In accordance with the preferred embodiment of the object reticle 30 depicted in FIGS. 8 and 9, the pitch of the cells is equal in both dimensions (i.e. $L_x=L_y=L$) and the aperture dimensions $l_x$ and $l_y$ vary in accordance with equations (2) and (3):

$$l_x = L/3 + n_x L/(3N_x) \quad n_x = 0,1,2, \ldots N_x \tag{2}$$

$$l_y = L/3 + n_y L/(3N_y) \quad n_y = 0,1,2, \ldots N_y \tag{3}$$

where $N_x$ and $N_y$ equal the total number of cells in the x and y dimensions of reticle 30 and $n_x$ and $n_y$ are integer indices of the cell number in the x and y dimensions respectively. It will be appreciated that the indices $n_x$ and $n_y$ uniquely identify a particular cell 34 within the reticle 30.

Although the variation of the aperture dimensions $l_x$ and $l_y$ in the preferred embodiment of the invention is described by equations (2) and (3), adherence to these equations is not a requirement. In general, there is no requirement that the aperture dimensions $l_x$ and $l_y$ vary linearly. All that is required by the invention, is that there is a known relationship between the dimension $l_x$ and the index $n_x$ and the dimension $l_y$ and the index $n_y$, so that knowledge of the aperture duty cycle described by equation (1) can be used to calculate the indices $n_x$ and $n_y$. Despite the generality of the required relationships between the dimensions $l_x$ and $l_y$ and the indices $n_x$ and $n_y$, the simple relationships of the preferred embodiment described by equations (1), (2) and (3) facilitate easy calculation of the coarse position as will be described below.

Radiation Banks, Radiation Stripes and Phase Signals

Figure 10:
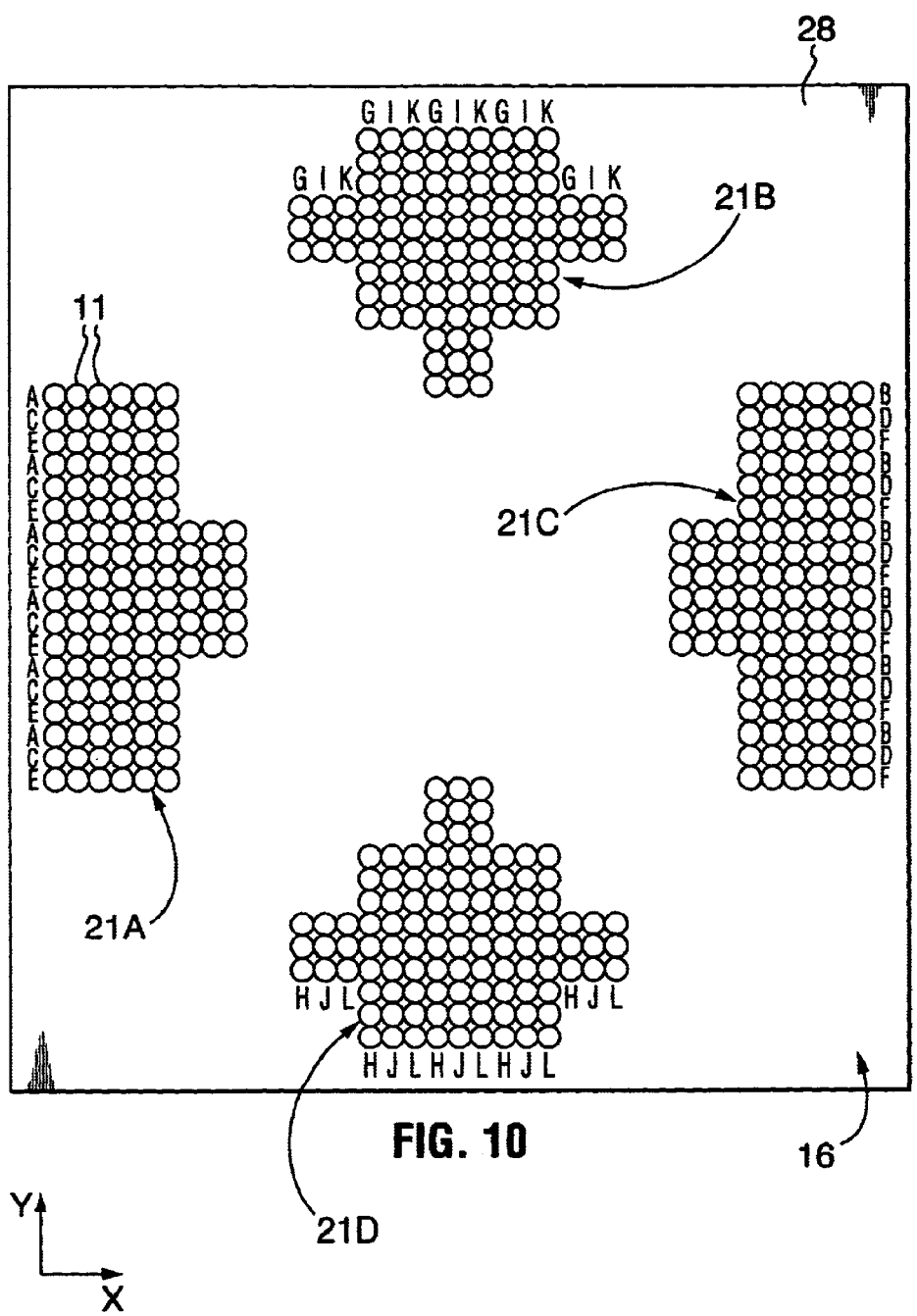
FIG. 10 shows the mounting assembly of the preferred embodiment of the present invention with four radiation banks, each comprising a plurality of periodic groups of radiation stripes.
Figure 16:
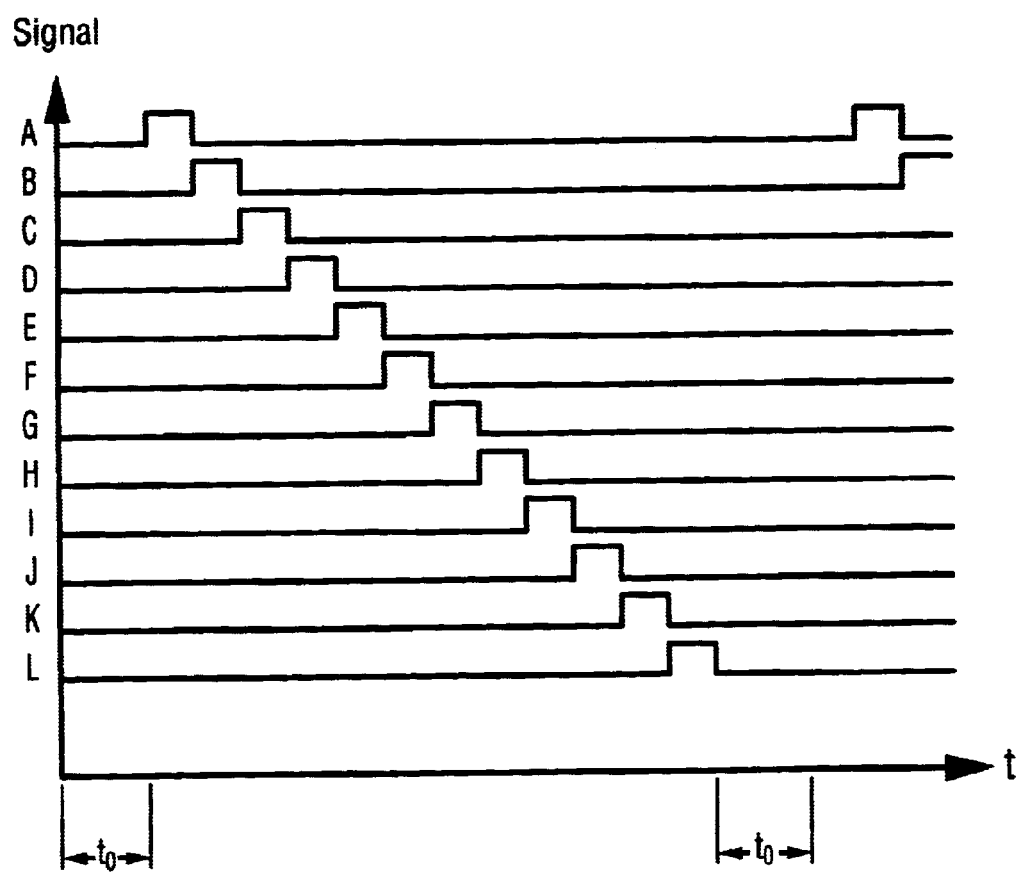
FIG. 16 depicts the timing associated with the pulsing of the various phases in the radiation banks.

FIG. 10 depicts a plan view of the mounting unit 28, to which the four radiation banks (21-A, 21-B, 21-C and 21-D) used in the preferred embodiment of the invention are affixed. In the illustrated embodiment, the individual radiation sources, which form the radiation banks (21-A, 21-B, 21-C and 21-D) are radiation emitting diodes, referred to throughout this application as "RED's". The RED's are depicted as circles in FIG. 10. Radiation bank 21-A comprises several spatially periodic groups of radiation stripes made up of rows of RED's labelled either A, C, or E. Similarly, radiation bank 21-C comprises several spatially periodic groups of radiation stripes made up of rows of RED's labelled either B, D, or F; radiation bank 21-B comprises several spatially periodic groups of radiation stripes made up of columns of RED'S labelled either G, I or K; and 21-D comprises several spatially periodic groups of radiation stripes made up of columns of RED's labelled either H, J or L. It will be appreciated that, in the illustrated embodiment, each group of spatially periodic radiation stripes (A through L) comprises a plurality of individual radiation stripes and that each individual radiation stripe comprises a plurality of RED's. As mentioned previously, all of the RED's in any one spatially periodic group of radiation stripes (A through L) are pulsed together and these pulses are referred to herein as "phases" (A through L). Generally, the pulsing of respective phases (A through L) may be multiplexed in the time domain. This time division multiplexing of phases (A through L) is depicted in FIG. 16. The control of the timing of phases (A though L) is dictated by a central clock signal. After each phase (A through L) is pulsed once, there is a period of time $t_o$, where no phases are pulsed. As will be explained below, this period of time $t_o$ may be used to measure the ambient radiation level for the purposes of normalizing the measured intensity of the phases (A through L).

Figure 11:
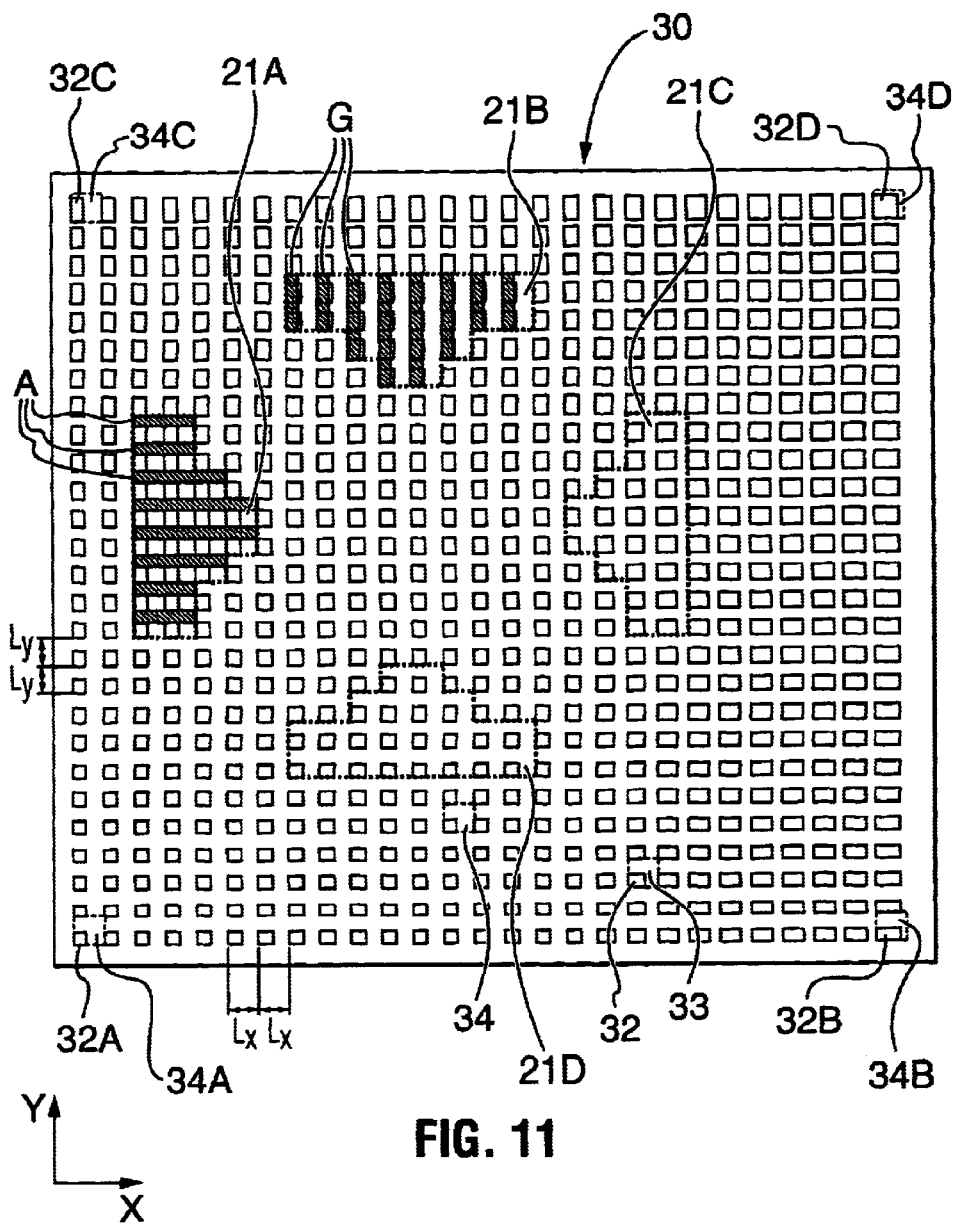
FIG. 11 depicts the image of the radiation banks on the object reticle in accordance with the preferred embodiment of the present invention.

Referring simultaneously to FIGS. 7 and 11, optical system 25 images the radiation from the radiation banks (21-A, 21-B, 21-C and 21-D) onto the object reticle 30. FIG. 11 depicts an outline of the images of the radiation banks (21-A, 21-B, 21-C and 21-D) on the surface of object reticle 30 after they are imaged by optical system 25. The image of a particular phase (A through L) within a radiation bank (21-A, 21-B, 21-C and 21-D) creates a spatially periodic pattern on the object reticle 30, which corresponds to the spatially periodic group of radiation stripes from which it is comprised. As discussed above, various groups of radiation stripes (i.e. phases (A through L)) are pulsed together, and this pulsing of phases (A through L) is multiplexed in time. As a result, only the image of one of the phases (A through L) is present on the reticle 30 at any given time. However, for the purposes of explanation, FIG. 11 depicts the spatially periodic images of phase A from radiation bank 21-A and phase G from radiation bank 21-B (shown shaded in FIG. 11) and the outlines of the images of the various radiation banks (21-A, 21-B, 21-C and 21-D) on the surface of the reticle 30 at the same time. As the object 40 moves in two dimensions with respect to the radiation banks (21-A, 21-B, 21-C and 21-D), the object reticle 30 also moves, Consequently, the positioning of the images of the radiation banks (21-A, 21-B, 21-C and 21-D) depicted in FIG. 11 will move with respect to the object reticle 30.

In accordance with the preferred embodiment of the present invention, the geometry of the radiation stripes, the grouping of radiation stripes (i.e. into phases A through L) and the optical system 25 are selected to achieve a number of criteria, including both size criteria and periodicity criteria. The image of an individual radiation stripe on the reticle 30 has two axes, one elongated axis and one short axis. Radiation banks 21-A and 21-C are made up of groups radiation stripes (i.e. phases A through F), which have their elongated axes oriented substantially parallel to the x-axis and radiation banks 21-B and 21-D have groups of radiation stripes (i.e. phases G through L), which have their elongated axes oriented substantially parallel to the y-axis. In this disclosure, a radiation stripe is said to be "oriented" along a particular axis if the elongated axis of the radiation stripe is substantially parallel to that axis.

In the preferred embodiment of the invention, there are three phases in each radiation bank (21-A, 21-B, 21-C and 21-D). The size of the radiation stripes and the optics 25 of the preferred embodiment are selected such that the image of a particular radiation stripe on the reticle 30 has an elongated axis that is substantially equal in size to an integral number of cellular pitches and a short axis that is substantially equal in size to ⅓ of a cellular pitch. For example, the images of radiation stripes in the phases oriented along the x-axis (i.e. phases A through F) have a length in the x-dimension substantially equal to an integral number of pitches $L_x$ and a length in the y-dimension substantially equal to ⅓$L_y$. Similarly, the images of radiation stripes in the phases oriented along the y-axis (i.e. phases G through L) have a length in the y-dimension substantially equal to an integral number of pitches $L_y$ and a length in the x-dimension substantially equal to ⅓$L_x$. In this manner, if three immediately adjacent radiation stripes in the same radiation bank were imaged onto the reticle 30, they would occupy an area with dimensions substantially equal to one cellular pitch on their short axis and an integral number of pitches on their long axis. For example, if three immediately adjacent radiation stripes in groups A, C and E were pulsed simultaneously, then their images on the reticle 30 would occupy an area with dimensions $L_y$ on the y-axis and an integral number of pitches $L_x$ on the x-axis. Similarly, if three immediately adjacent radiation stripes in groups G, I and K were pulsed simultaneously, then their images on the reticle 30 would occupy an area with dimensions $L_x$ on the x-axis and an integral number of pitches $L_y$ on the y-axis. It will be appreciated from these size criteria of the preferred embodiment, that if an entire radiation bank (21-A, 21-B, 21-C or 21-D) was imaged at once, it would occupy an area on the reticle 30 equal to that of an integral number of cells.

In addition to the size criteria set out above, the images of the preferred embodiment of the phases (A through L) have certain periodicity criteria. As depicted by the image of phase A on the reticle 30 in FIG. 11, the images of phases oriented along the x-axis (A through F) are periodic along the y-axis with a spatial period substantially equal to the cellular pitch $L_y$ of the reticle 30. Similarly, as depicted by the image of phase G in FIG. 11, the images of the phases oriented along the y-axis (G through L) are periodic along the x-axis with a spatial period substantially equal to the cellular pitch $L_x$ of the reticle 30. As a consequence of these periodicity criteria, when a phase (A through L) containing a group of radiation stripes is imaged onto reticle 30, the images of the individual radiation stripes occupy the same spatial phase in adjacent cells. For example, FIG. 11 shows that the individual radiation stripes in the image of phase A occupy the same spatial phase (i.e. y-position) within neighbouring rows of cells. Similarly, the individual radiation stripes in phase G occupy the same spatial phase (i.e. x-position) within adjacent columns of cells. This periodicity criteria results in a spatial phase relationship. The projection of the spatially periodic phases (A through L) onto the reticle 30 creates a Moiré effect similar to that created by having back to back periodic reticles in conventional Moiré encoders.

Although the preferred embodiment discloses radiation banks having three groups of radiation stripes (i.e. three phases) in each radiation bank (21-A, 21-B, 21-C and 21-D), the number of phases in each radiation bank is not limited to three. The invention should be understood to incorporate schemes having different numbers of phases provided that the images of the radiation stripes meet the size and periodicity criteria outlined above. In addition, the individual radiation stripes need not comprise RED's. Generally, any light source that can be shaped into a geometry able to approximate the size and periodicity criteria discussed in this disclosure may be used to form the radiation stripes and the radiation banks.

Referring back to FIG. 7, light that is transmitted through the object reticle 30 is collected by optical system 26 and directed onto the photodetector 23, which produces electronic signals in proportion to the intensity of the transmitted radiation. A controller (not shown) uses timing information to de-multiplex the signals and uniquely determine the radiation intensity for the individual phases (A through L). The controller samples the electronic intensity signals from each phase (A through L) and uses the sampled signals to calculate the absolute position of the object reticle 30 as described below. In general, any reference to a "controller" in this disclosure refers to any processor capable of the functionality described herein and includes, without limitation, any processor ranging between microprocessors forming part of an embedded system and distinct computers running applicable software.

The embodiment depicted in FIG. 7 is not unique. There are many embodiments capable of measuring the individual radiation signals from each phase (A through L). For example, the technique of the preferred embodiment involves multiplexing the phases (A through L) in time and then measuring them using a single photodetector. However, an alternative embodiment involves continuously active radiation signals from each radiation bank (21-A, 21-B, 21-C and 21-D) or each phase (A through L) and a plurality of photodetectors, each photodetector shaped and aligned, to receive signals from a particular radiation bank (21-A, 21-B, 21-C and 21-D) or a particular phase (A through L) Another alternative embodiment involves using different wavelengths of radiation for each phase (A through L) and having distinct wavelength sensitive photodetectors or band pass filters corresponding to each phase (A through L). The invention should be understood to incorporate any means of uniquely measuring the radiation signals from each phase (A through L). It will be appreciated, however, that the preferred embodiment using time division multiplexing of phases (A through L) and a single photodetector has the inherent advantage of being able to be produced with relatively inexpensive "off the shelf" type components.

Phrase Normalization

Prior to using the measured intensity of the various phases (A through L) to calculate the position of the reticle 30, the signals measured by the photodetector 23 are normalized to remove the effects of stray radiation and intensity variation in the individual RED's. Referring to FIG. 7, an extra normalization photodetector 22 is located in a position such that it is able to detect the full intensity of the various phases (A through L) before the radiation signals are modulated by the reticle 30. Thus, the normalization photodetector 22 detects the full intensity of each phase (A though L) as if the opaque areas 33 of the reticle 30 had not blocked any part of the radiation signal. Normalization photodetector 22 may include its own optical system (not shown in FIG. 7), which is operative to image the light from the radiation banks (21-A, 21-B, 21-C and 21-D) onto the surface of the normalization photodetector 22.

In accordance with the present invention, normalization of phases (A through L) is a two step process. The first step of the normalization procedure involves the subtraction of an offset from each phase (A through L) to account for background stray radiation that may be inadvertently measured by photodetector 23. As discussed above, the amount of the offset to be subtracted during normalization is determined by photodetector 23 during the period $t_o$ (see FIG. 16), where no phases (A through L) are being pulsed. In the second step of the normalization procedure, the controller takes the ratio of each phase (A through L) measured by photodetector 23 (after it has been modulated by reticle 30) to that of the corresponding un-modulated phase (A through L) measured by normalization photodetector 22. This process of taking the ratio of the modulated signal to the un-modulated signal helps to reduce the effect of imperfections, which could lead to a variation in the measured radiation intensity between the different phases. Such imperfections include non-uniformity in the performance of individual RED's and corruption of the reticle by contaminants or by poor lithography. In addition, normalization compensates for environmental temperature variation, which impacts on the output radiation intensity of the RED's.

From this point forward in the disclosure, any discussion of the signals from the various phases (A through L) should be understood to refer to the normalized signals. In particular, all calculations performed by the controller in relation to determining the position of the reticle 30 are made using normalized signals.

Calculation of the Coarse Position and Fine Position

The first step to uniquely identifying the absolute position of the object reticle 30 is to establish its position to within the area of a particular cell. This process is referred to as calculating the "coarse position" of the reticle 30. In addition to determining the coarse position, the controller also calculates the position of the reticle 30 within the particular cell This second process is referred to in this disclosure as determining the "fine position". The manner in which the controller uses the normalized phases (A through L) measured by photodetector 23 to determine the absolute position of the object reticle 30 is explained most easily by considering a simple embodiment that incorporates the principles of the invention.

FIG. 12 depicts a simplified implementation that incorporates the principles and captures the essence of the present invention. The embodiment depicted in FIG. 12-A requires only two radiation banks (21-A and 21-B), with each radiation bank (21-A and 21-B) having only three radiation stripes. Radiation bank 21-A has three radiation stripes (A, B and C) oriented along the x-axis and radiation bank 21-B has three radiation stripes (G, H and I) oriented along the orthogonal y-axis. Rather than having groups of simultaneously pulsed radiation stripes, the phases (A, B, C, G, H and I) of radiation banks (21-A and 21-B) of FIG. 12 comprise only single radiation stripes (A, B, C, G, H and I) that are pulsed individually. FIG. 12-B depicts the images of the two radiation banks (21-A and 21-B) as they would appear on the reticle 30, if all of the phases (A, B, C, G, H and I) were on simultaneously. The object reticle 30 is identical to that of the preferred embodiment depicted in FIG. 8, with a plurality of cells 34 having constant pitch $L_x$ in the x direction and $L_y$ in they direction and a variable aperture duty cycle. To simplify and clarify the drawings, FIG. 12-B does not show the apertures and the opaque areas of each of the cells 34.

In the simple implementation described by FIG. 12, the radiation banks (21-A and 21-B), the radiation stripes (A, B, C, G, H and I), and the optical system (not shown) are still selected to meet the size criteria discussed above. In the simplified embodiment of FIGS. 12A, 12B and 13, the images of each radiation bank (21-A and 21-B) on the object reticle 30 are substantially exactly the same size as one of the cells 34 in the reticle 30. This satisfies the size criteria, because the image on the reticle 30 of each of the radiation banks (21-A and 21-B) occupies an area equal to that of an integral number of cells (i.e. one). It will be appreciated that the periodicity criteria need not be satisfied by the simplified embodiment, because there is only one radiation stripe in each phase (A, B, C, G, H, I).

Figure 13:
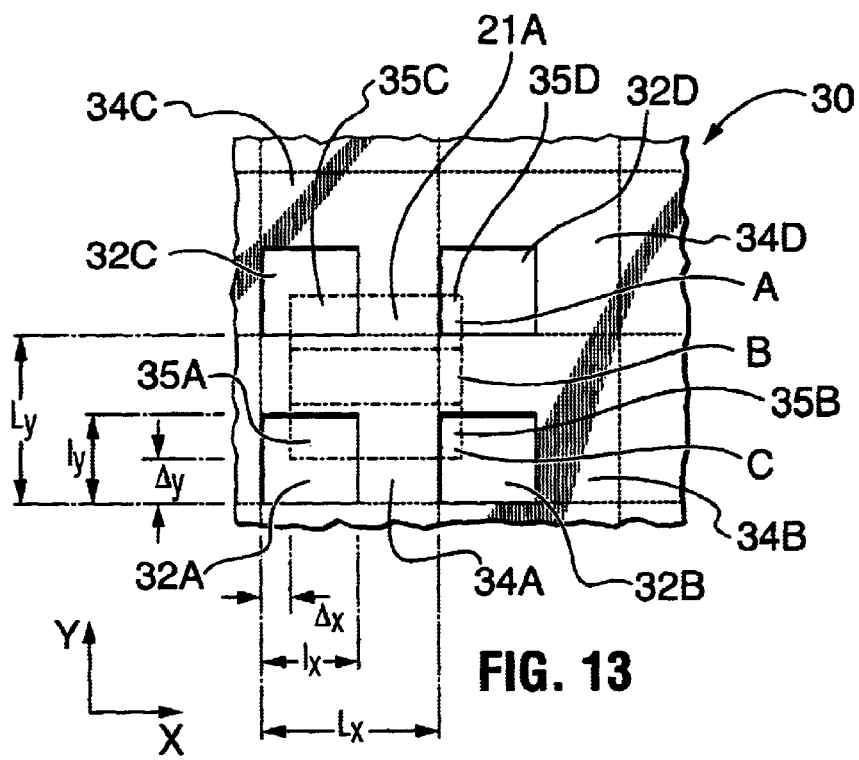
FIG. 13 is a magnified view of the image of a single radiation bank in the simplified embodiment of the present invention as it appears on the object reticle.

FIG. 13 depicts a close-up view of the image of the radiation bank 21-A on the object reticle 30. Because the dimensions of the image of the radiation bank 21-A are $L_x$ by $L_y$ (i.e. substantially the same as the cellular pitch of the object reticle 30), the image of the radiation bank 21-A will overlap a maximum of four cells (34-A, 34-B, 34-C and 34-D). In the most general case, the image of the radiation bank 21-A will also overlap the apertures (32-A, 32-B, 32-C and 32-D) in each of the four cells (34-A, 34-B, 34-C and 34-D). In FIG. 13, the areas where the image of the radiation bank 21-A overlaps the apertures (32-A, 32-B, 32-C and 32-D) are designated (35-A, 35-B, 35-C and 35-D) respectively.

The photodetector (not shown in FIG. 13) behind the object reticle 30 independently measures the intensity the transmitted radiation from each of the phases (A, B and C) and produces corresponding electronic signals, which are sampled and normalized by the controller (not shown in FIG. 13) as described above. In the scenario depicted in FIG. 13, it will be appreciated that the signal from phase A will be proportional to the sum of areas 35-C and 35-D. Similarly, the signal from phase C will be proportional to the sum of the areas 35-A and 35-B. Clearly, there will be no appreciable signal transmitted from the image of phase B as it is completely blocked by the opaque areas of the reticle 30. It will be appreciated that the sum of the signals from the three phases (A, B and C) in the radiation bank 21-A is proportional to the sum of the areas (35-A, 35-B, 35-C and 35-D) where the image of the radiation bank 21-A overlaps the apertures (32-A, 32-B, 32-C and 32-D) of the reticle 30.

Referring to FIG. 13, the sum of the signals from each radiation stripe (A, B and C) is designated $I_1$, then:

$$I_1 \propto A_1 = A_{35A} + A_{35B} + A_{35c} + A_{35D} \quad (4)$$

$$\approx (l_y - \Delta_y)(l_x - \Delta_x) + \Delta_x(l_y - \Delta_y) + \Delta_y(l_x - \Delta_x) + \Delta_x \Delta_y$$

where $l_x$ and $l_y$ are the dimensions of aperture 32-A and $\Delta y$ and $\Delta x$ represent the displacement (in both dimensions) of the image of the radiation bank 21-A from the corner of the cell 34-A. In general, equation (4) will hold true, provided that:

$$l_y - L_y < \Delta_y < l_y \quad (5a)$$

and $$l_x - L_x < \Delta_x < l_x \quad (5b)$$

When equation (4) is expanded and the like terms collected, it can be reduced to:

$$A_1 \approx l_y l_x \quad (6)$$

The approximation in equation (6) arises because of the variation in the size of neighbouring apertures 32. Equation (6) suggests that the signal $I_1$ representing the sum of the radiation stripes (A, B and C) is proportional to the area $(l_x l_y)$ of the aperture 32-A in cell 34-A. This information alone, however, is not enough to uniquely identify the coarse position of the object reticle 30.

However, recall equations (2) and (3):

$$l_x = L/3 + n_x L/(3N_x) \quad n_x = 0,1,2, \ldots N_x \quad (2)$$

$$l_y = L/3 + n_y L/(3N_y) \quad n_y = 0,1,2, \ldots N_y \quad (3)$$

Assume (for simplicity) that $L_x = L_y = L$ and suppose that cell 34-A has the indices $n_x = n_{x1}$ and $n_y = n_{y1}$, then equations (2) and (3) may be substituted into equation (6) to yield:

$$A_1 = \left(\frac{1}{3}L\right)^2 \left(1 + \frac{n_{x1}}{N_x}\right)\left(1 + \frac{n_{y1}}{N_y}\right) \quad (7)$$

Referring back to FIG. 12-B, the image of radiation bank 21-B must now be considered. It will be appreciated that radiation stripes (G, H and I) will cause the photodetector to produce similar electronic signals to those of radiation bank 21-A and that the controller may normalize those signals and generate a signal $I_2$ (similar to the signal $I_1$) in respect of radiation bank 21-B. Assume that the image of radiation bank 21-B overlaps a cell indexed by $n_x = n_{x2}$ and $n_y = n_{y2}$. It can be seen from FIG. 12-B that $n_{y2} = n_{y1} = n_y$ and $n_{x2} = n_{x1} + N_d$, where $N_d$ is a known quantity that represents the distance between the image of radiation bank 21-A and the image of radiation bank 21-B as measured in the number of cellular pitches $L_x$. Thus, for signal $I_2$ from radiation bank 21-B, equation (7) may be rewritten:

$$A_2 = \left(\frac{1}{3}L\right)^2 \left(1 + \frac{n_{x1}}{N_x} + \frac{N_d}{N_x}\right)\left(1 + \frac{n_y}{N_y}\right) \quad (8)$$

Now if we take the difference between the signals $I_1$ and $I_2$, it may be seen that:

$$A_2 - A_1 = \left(\frac{1}{3}L\right)^2 \left(\frac{N_d}{N_x}\right)\left(1 + \frac{n_y}{N_y}\right) \quad (9)$$

In equation (9) all of the quantities are known with the exception of $n_{y1}$. Consequently, equation (9) may be solved for $n_{y1}$ and then the value of $n_{y1}$ may be substituted back into equation (7) to solve for $n_{x1}$. As a result, indices $n_{x1}$ and $n_{y1}$ are known and the absolute position of the reticle 30 is uniquely determined to within the cell 34-A that has the indices $n_{x1}$ and $n_{y1}$. That is, the coarse position of the reticle 30 is determined to be within the cell 34-A indexed by an and $n_{y1}$.

For the purposes of the algebraic explanation described above, equations (5a) and (5b) represent the mathematical boundaries of the cell 34-A. That is, if $\Delta y$ or $\Delta x$ falls outside of the range of equations (5a) or (5b), then the controller will determine the coarse position of the reticle 30 to be in a different cell. It should be noted here, that the construction of a cell with the aperture in the lower left-hand corner is simply a convenient tool for discussion of the invention. In general, the mathematical description of a cell may incorporate any type of cellular boundary, such as the one described in equations (5a) and (5b), provided that the dimensions of a cell are $L_x$ and $L_y$.

The algebraic explanation described above demonstrates how the controller can use the signals $I_1$ and $I_2$ to calculate the coarse position. As described above, the quantities $I_1$ and $I_2$ are derived by adding together the normalized signals from the various phases (A, B, C, G, H and I) for each of the radiation banks (21-A and 21-B). It will be appreciated, that depending on controller resources (i.e. memory, time, speed etc.), a controller can be programmed to use a predetermined look-up table to directly identify the coarse position from the measured values of $I_1$ and $I_2$, without having to reproduce the calculation for each measurement.

In general, the mathematical description given above demonstrates that using two radiation banks to illuminate two distinct areas on the reticle, a controller can uniquely determine the coarse position of the reticle, provided that the reticle has a constant cellular pitch and a known variation in aperture duty cycle. The determination of the coarse position yields the position of the reticle to within the area of a single cell. In practice, there are many computational techniques that can be employed by a controller to derive the coarse position from the measurements of the various phases (A, B, C, G, H, and I). The invention should be understood to incorporate any mathematical and computational means of deriving the coarse position from the measurements of the various phases (A, B, C, G, H, and I) and all of the other information that may be available to the controller. Such other information available to the controller may include information about the current or previous fine position measurement, the current or previous coarse position measurement and other data, such as calibration information and system specific information.

As detailed in the mathematical explanation above, the controller can determine the coarse position of the object reticle 30 to within the area of a particular cell using the normalized phases (A, B, C, G, H and I). The phases (A, B, C, G, H and I) may also be used to determine the fine position of the object reticle 30 within the particular cell identified by the coarse position measurement.

Figure 14:
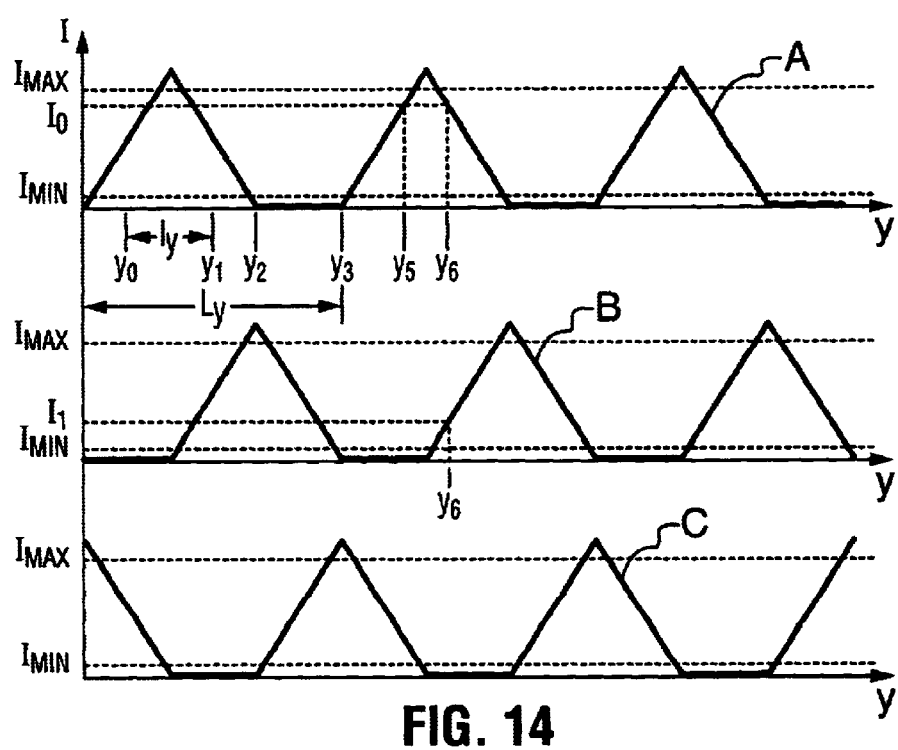
FIG. 14 is a graph depicting a plot of the measured intensity of the phases from the various radiation stripes in one of the radiation banks of the simplified embodiment of the invention.

FIG. 14 depicts idealized and normalized intensity signals from the three phases (A, B and C) as a function of the displacement of the reticle 30 in the y direction. Looking at the signal corresponding to phase A, the portion of the signal between $Y_0$ and $Y_1$ represents the area that the image of radiation stripe A is directly overlapping an aperture 32 having a y-dimension $l_y$. For the portion of the signal between $Y_2$ and $y_3$, the image of the radiation stripe A is completely hidden behind an opaque area 33 of the reticle 30 and, consequently, the intensity of phase A is near zero in this region. The period of each phase (A, B and C) is the pitch $L_y$ of the reticle 30 on the y-axis, but the duty cycle of each phase (A, B and C) varies slightly as the reticle 30 moves in the y-direction. The variation in duty cycle of the signals (A, B and C) is a result of the variation of the aperture duty cycle on the reticle 30. As with the prior art Moiré type encoder, measurement of an intensity $I_o$ for phase A does not uniquely identify the fine position of the reticle 30, because the reticle could be in position $y_5$ or $y_6$. Consequently, phase B or phase C must also be measured. It will be appreciated that if phase B is measured to have intensity $I_1$ at substantially the same time that phase A has an intensity of $I_o$, then the fine position of the reticle 30 on the y-axis is determined to be $y_6$.

In some circumstances, measurement of a particular phase (A, B or C) may yield a result where the signal is in the zero-derivative range (i.e. at a peak) or in the region where the signal is in a flat region (i.e. phase A in the region between $y_2$ and $y_3$). Such a measurement may yield an indeterminate result, because the direction of movement cannot be concluded from the measurement of that particular phase. If phase A was measured and determined to be in such a state, then one of the other phases (B or C) must be used as the principal phase to determine the fine position. A simple method to determine whether a first measured phase is in the indeterminate ranges and that another phase must be used as the principal phase to determine the fine position involves the imposition of thresholds, such as $I_{max}$ and $I_{min}$. If the intensity of phase A is measured to be above $I_{max}$, then it is too close to a peak and phase B or C must be used as the principal phase to determine the fine position. Similarly, phase B or C must also be used as the principal phase to determine the fine position when the intensity of phase A is measured to be below $I_{min}$. It will be appreciated that with aperture duty cycles that range from ⅓ to ⅔, at least one of the three phases A, B or C will be within the range between $I_{min}$ and $I_{max}$ and therefore, be sensitive to small changes in position.

The process of determining the fine position on the x-axis is substantially similar to the process for determining the fine position on the y-axis described above. It will be appreciated that the three radiation stripes (G, H and I) depicted in FIG. 12 will produce phases with similar signals to those depicted in FIG. 14 as the reticle 30 moves on the x-axis. To ensure that the encoder is functional to capture the fine position on both the x and y axes, the two radiation banks 21-A and 21-B have the elongated axes of their respective radiation stripes (A, B and C) and (G, H and I) oriented in orthogonal directions.

Figure 1:
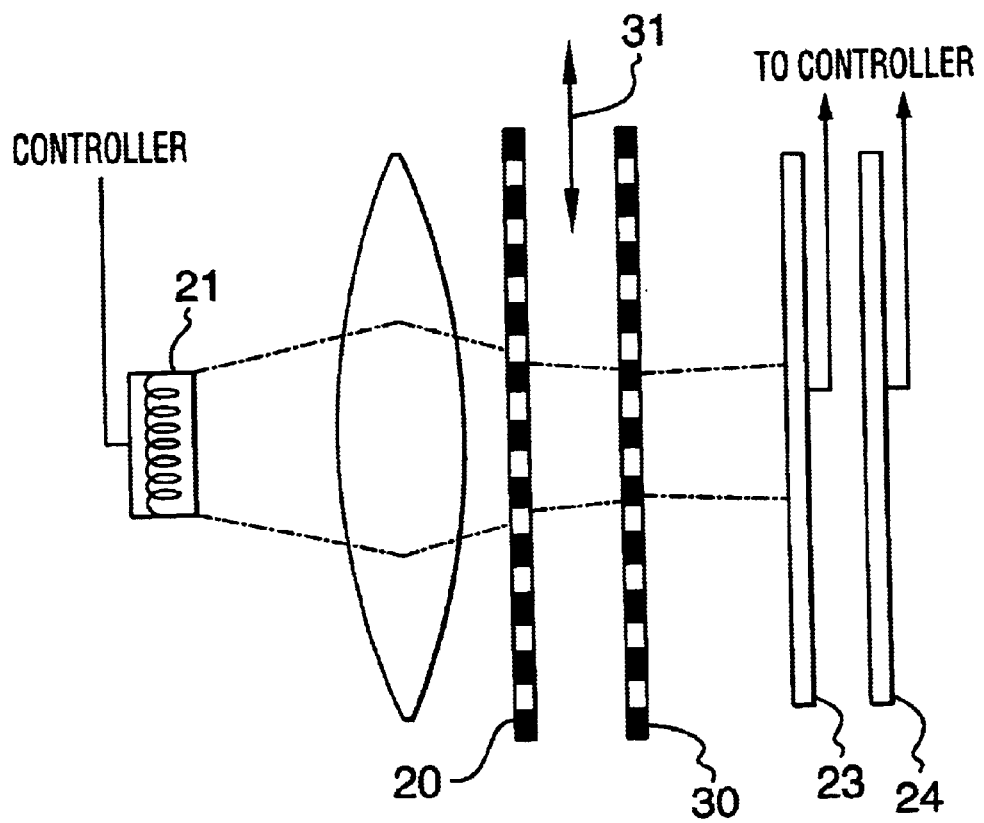
FIG. 1 depicts a prior art Moiré type optical encoder.
Figure 3:
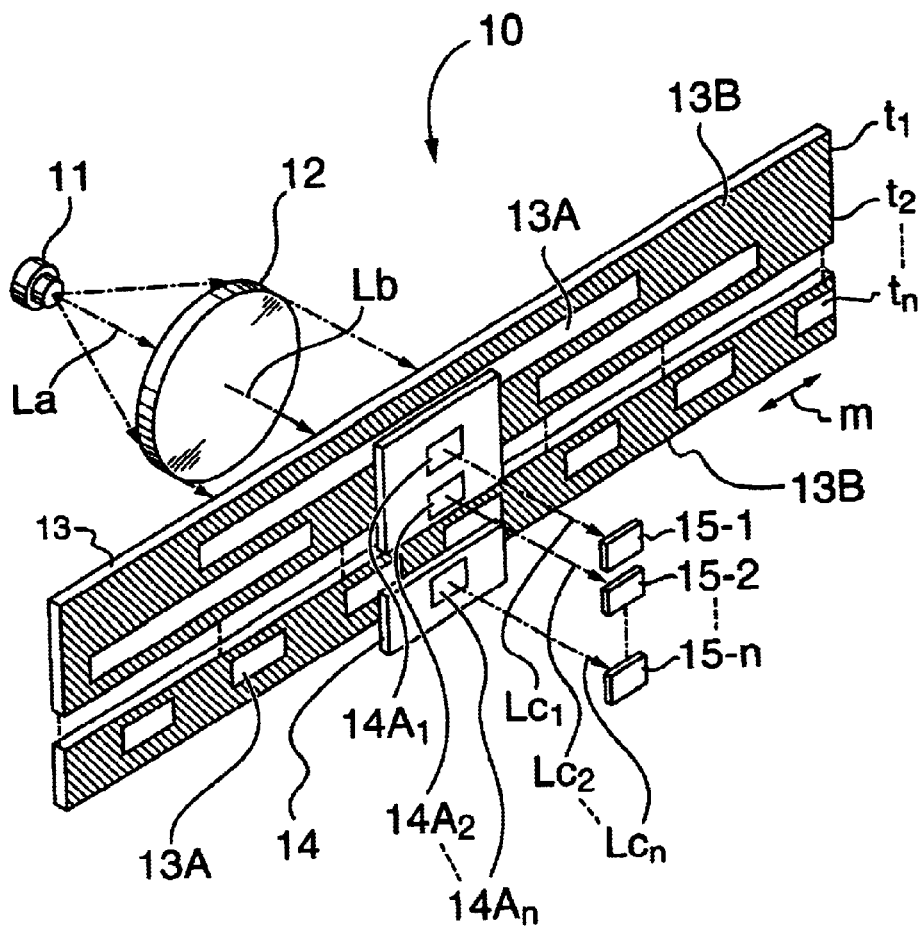
FIG. 3 depicts a typical prior art Gray code type absolute position encoder system.
Figure 4:
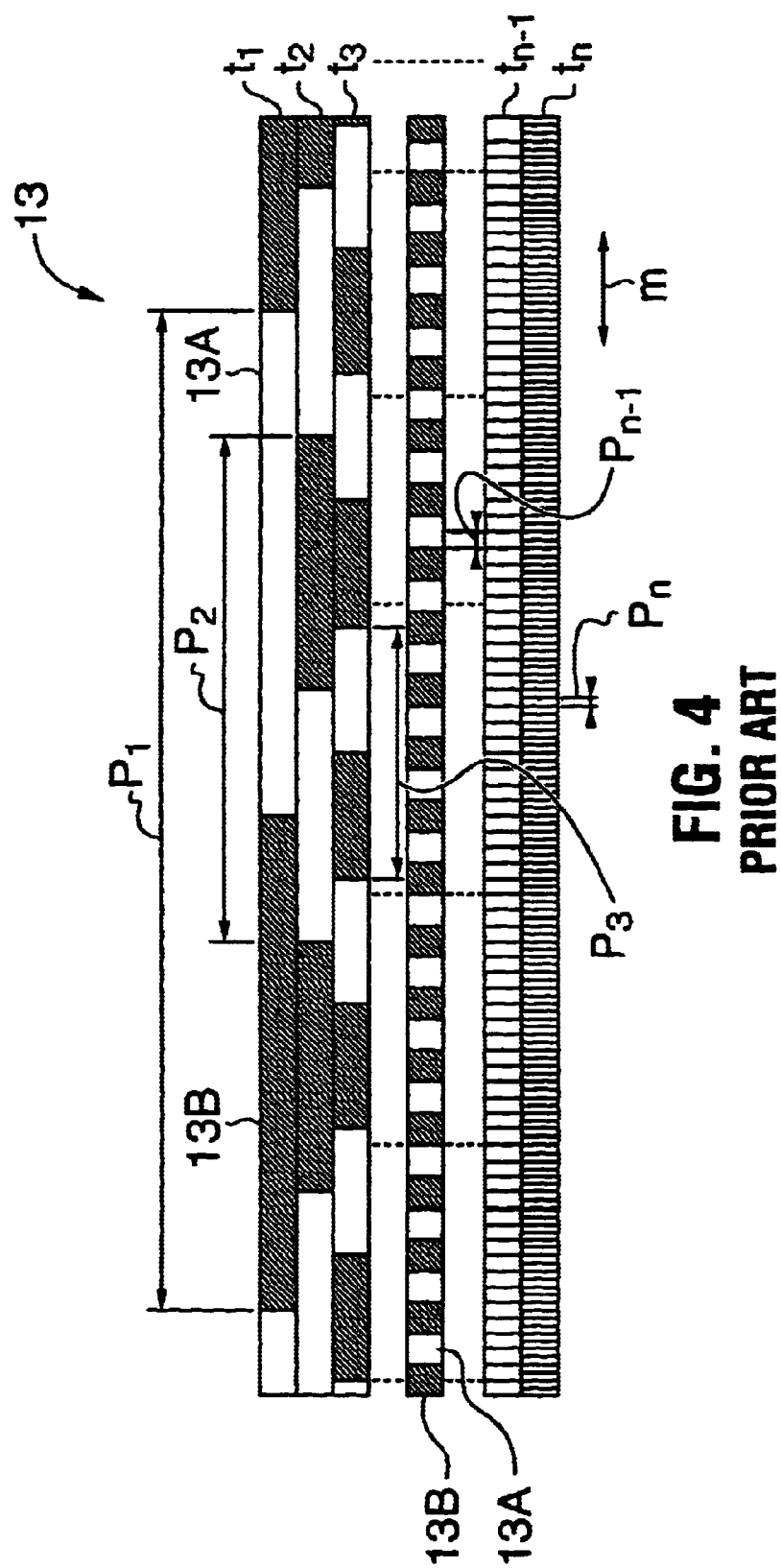
FIG. 4 depicts the first scale of a typical prior art absolute position encoder, showing the pitches and aperture duty cycles of the various grating tracks.
Figure 5:
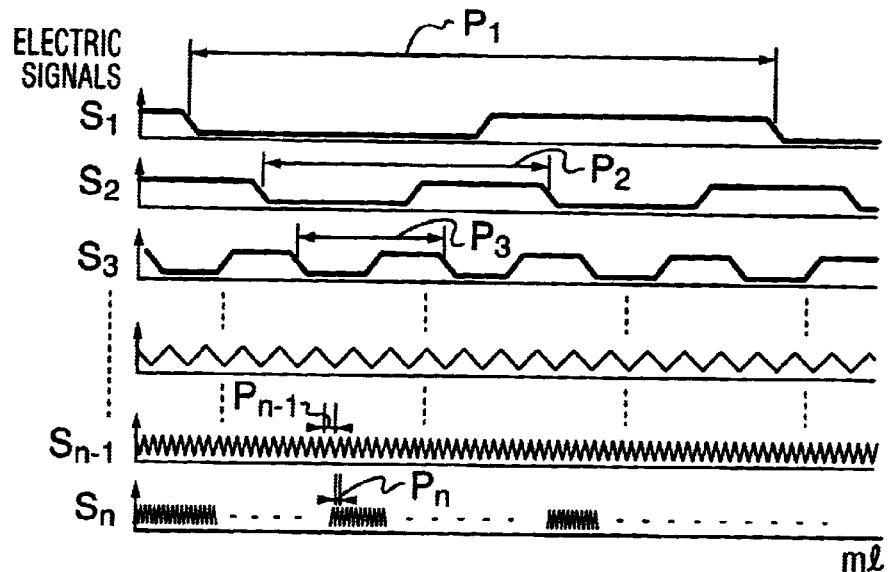
FIG. 5 shows the electrical signals generated by each of the photodetectors in a typical prior art absolute position encoder scheme.
Figure 6:
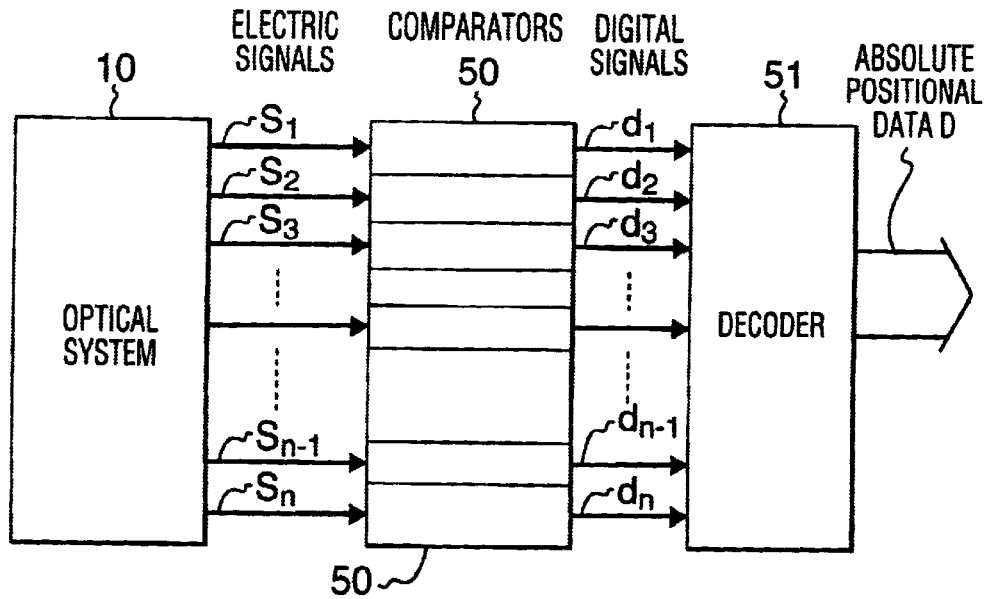
FIG. 6 is a schematic diagram of a detection circuit of a typical absolute position encoder.
Figure 15A:
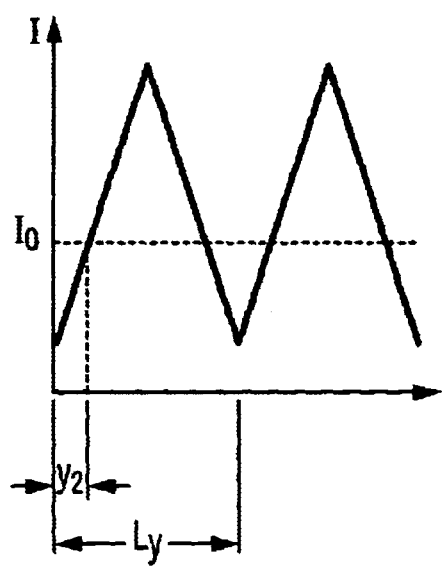
FIG. 15 depicts several periods of a particular phase at two distinct regions of the reticle, showing the variation of the signal with the aperture duty cycle of the reticle.
Figure 15B:
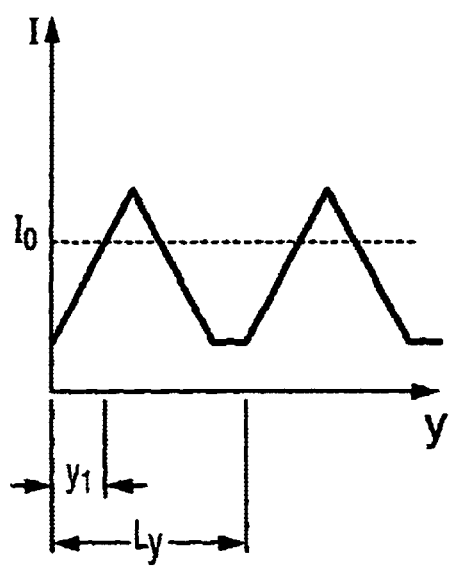

The controllers of conventional Moiré-type encoders typically employ a single look-up table to determine the position of the reticle from the intensity of the phase signals. However, the present invention's variation in aperture duty cycle causes the intensity profile of a given phase signal to vary from cell to cell. That is, the measurement of a particular phase intensity will not always yield the same position within different cells. For example, when the aperture duty cycle is ⅓, a given signal intensity will correspond to a different fine position than when the aperture duty cycle is ⅔. This difference is depicted in FIG. 15, which illustrates several periods of a given phase signal in two regions of the reticle 30 with distinctly different aperture duty cycles. It can easily be seen that a given intensity $I_o$ corresponds to a different position within the cell depending on the aperture duty cycle of that particular cell. When the aperture duty cycle is approximately ⅓ (as in FIGS. 15-3), a given intensity $I_o$ yields a fine position $y_1$ within the cell, but when the aperture duty cycle is approximately ⅔ (as in FIG. 15-A), the same intensity $I_o$ yields a different fine position $y_2$ within the cell.

Because of the variation in the aperture duty cycle that is fundamental to this invention, any look-up table that is used to accurately determine the fine position should be unique to a particular cell. For this reason, the coarse position of the reticle 30 is preferably calculated prior to calculation of the fine position to identify the particular look-up table to be used.

When it is known that movement of the reticle 30 is going to be within a predetermined range, an "average" look-up table may be used to get an approximate determination of the fine position. For example, if the range of movement of the reticle 30 is approximately ten pitches in any given direction, then a look-up table comprising the average of a signal in those particular 100 cells may be used to determine an approximate fine position. An approximate determination of the fine position may be sufficient for some applications, but obviously, this technique provides a less accurate fine position measurement, than having individual look-up tables for each cell. This approximation technique allows a significant reduction in controller resources (i.e. speed, instruction cycles and memory). The use of the average look-up table to calculate an approximate fine position is independent of the actual cell in which the fine position is being determined. For this reason, the average look-up table technique has another advantage in that it does not require knowledge of the coarse position and may be employed concurrently (or prior to) the coarse position calculation.

In some instances (depending on controller resources and calculation time available), it may be suitable or advantageous to combine the average look-up table technique with the individual look-up table technique. A combination of these two techniques involves using the average look-up table first, to determine an approximate fine position. This initial procedure enables a rapid calculation of the approximate fine position and, subsequently, the coarse position may be calculated. After the coarse position measurement determines a particular cell, the fine position can be determined more accurately using a look-up table corresponding to that particular cell.

The explanation given above for the calculation of the coarse position and the fine position of the reticle 30 was given with reference to the simplified embodiment of FIGS. 12–15. In the preferred embodiment depicted in FIGS. 7–11, four radiation banks (21-A, 21-B, 21-C and 21-D) are employed, rather than two radiation banks of the simplified embodiment. In addition, the phases of radiation banks (21-A, 21-B, 21-C and 21-D) of the preferred embodiment comprise spatially periodic groups of radiation stripes (A through L), rather than individual radiation stripes of the phases in the simplified embodiment. Finally, when the radiation banks (21-A, 21-B, 21-C and 21-D) of the preferred embodiment are imaged onto the reticle 30, their dimensions are larger than those of a single cell (i.e. $L_x$ by $L_y$).

The relatively large size of the radiation banks (21-A, 21-B, 21-C and 21-D) and the addition of the third and fourth radiation banks in the preferred embodiment improve the performance of the device. The description for the simplified embodiment discussed above is an ideal description used to facilitate simple explanation. In practice, there are many factors, such as: potential rotation of the object reticle 30, shadow from the object 40, the effect of using discrete RED sources (rather than perfectly shaped radiation stripes) and surface defects (such as lithography variations or contaminants) on the surface of the reticle 30, which have a tendency to adversely affect the ideal performance of the device. The implementation of the preferred embodiment helps to reduce, identify and quantify these undesirable effects.

For example, having third and fourth radiation banks facilitates measurement of rotation of the reticle 30. Referring to the embodiment depicted in FIG. 10, radiation banks 21-A and 21-C are both made up of radiation stripes having their elongated axes oriented along the x-axis. Thus, the various phases from either one of radiation banks 21-A or 21-C can be used to measure the fine position of the reticle 30 on its y-axis in a manner similar to that of the simplified embodiment described above. However, if the fine position measured by radiation bank 21-A is different from that of radiation bank 21-C, then the reticle 30 must be rotated in relation to the radiation banks (21-A, 21-B, 21-C and 21-D). If the difference in the fine position determined using the signals from radiation banks 21-A and 21-C is $d_y$ and the separation between the radiation banks 21-A and 21-C is $N_d$, then the angular rotation q in radians can be determined according to:

$$\theta = \sin^{-1}(\delta_y/N_d) \approx \delta_y/N_d \quad (10)$$

In addition to measuring rotation, the large size and large number of the radiation banks (21-A, 21-B, 21-C, 21-D) in the preferred embodiment provide extra light intensity and a larger area of coverage on the reticle surface. The additional light and area of coverage improve the signal to noise ratio of the device, which helps to overcome the practical difficulties associated with discrete RED sources and the shadow of the object 40. In addition, the large size and the large number of radiation banks helps to reduce the effects of surface defects, such as lithographic imperfections and impurities on the surface of the reticle 30.

In the simplified embodiment of FIGS. 12–15, the images of the radiation banks (21-A and 21-C) are exactly the same size as a single cell in the reticle 30. In contrast, the images of radiation banks (21-A, 21-B, 21-C and 21-D) on the reticle 30 in the preferred embodiment are larger than the dimensions of a cell. However, as discussed above, the area of each radiation bank image is substantially equal to the area of an integral number of cells. Provided that the area of the image of the radiation banks (21-A, 21-B, 21-C and 21-D) on the reticle 30 is substantially equal to the area of an integral number of cells, the intensity of the sum of the phases from a given radiation bank will be determinative of the area of the apertures of the cells covered by that radiation bank image. This total aperture area will be approximately constant for a range up to one pitch in each direction. For example, the sum of the phases (A, C and E) from the image of radiation bank 21-A will be approximately constant for a range of up to one pitch in each direction. Having two or more radiation banks (21-A, 21-B, 21-C and 21-D) facilitates calculation of the coarse position based on the information available from the sums of the phases (A through L) from each such radiation bank (21-A, 21-B, 21-C and 21-D). It will be appreciated that an algebraic calculation of the coarse position for the preferred embodiment with the four larger radiation banks (21-A, 21-B, 21-C and 21-D) is an extension of the same principles used for the simplified embodiment, except that the details of the calculation are slightly more complex. Because of the periodicity requirement of the phases (A through L), the calculation of the fine position is substantially exactly the same in the preferred embodiment as it is in the simplified embodiment. Practically, however, it is easier to calculate the fine position in the preferred embodiment, because the signal to noise ratio is considerably improved with the large number of cells covered by the preferred embodiment's phases (A through L).

Two-dimensional Position Control System

The encoder described above is particularly applicable to the implementation of a two-dimensional control system, for the positioning of a particular object 40. The encoder is useful to determine the actual position of the object 40 on two dimensions. A control system normally operates in a dynamic mode and it is used to control the movement of the object 40 from an original position to a new target location. Assuming that the object 40 starts at a given position, the control system will receive a command to move the object 40 to a new target position. Upon receipt of this command, the controller compares the new target position to the actual position of the object 40 (as measured by the encoder). When it determines that there is a difference between the actual position of the object 40 and the new target position, the controller causes actuators to be fired and the object 40 begins to move quickly toward the new target position. As the object 40 approaches the new target position, the difference between the actual position of the object 40 (as measured by the encoder) and the new target position is reduced; consequently, the controller reduces the drive signal to the actuators and the movement of the object 40 begins to slow. Eventually, the object 40 will arrive at the new target cell. At this point, the controller no longer has to focus on the measurement of the coarse position, because the actual coarse position and the new target coarse position are the same. Since the actual cell is known, the controller can then determine the accurate fine position in the manner discussed above using the particular look-up table corresponding to the desired target cell. The control system then servo-locks onto the accurate fine position, without having to calculate the coarse position again until it receives the next instruction to move.

It should also be understood that in the case where it is not necessary to utilize the encoder in an absolute mode the invention is still advantageous as a relative encoder. There are possible embodiments of an encoder where the absolute position is not a critical factor and which is more important is a precise determination of motion relative to a starting point. In this case the preferred embodiment can be considerably simplified, no longer requiring the reticle to be patterned with a variation across two orthogonal axes, and subsequent position determination by the controller significantly reduced in computational complexity.

Alternative Embodiments and Improvements

Referring to the previously described embodiments of FIGS. 10 and 11, the reticle 30 is designed such that the aperture duty cycle varies linearly from cell to cell along the x and y axes in accordance with equations (2) and (3). As mentioned above, this linear relationship is not a requirement of the invention. One variation on the previously disclosed embodiments involves using a reticle (not shown) having multiple periodic variations of aperture duty cycle on each of the x and y axes. Such a reticle is said to have multiple "chirps". For example, the dimensions of the apertures of such a reticle could have two chirps on each dimension as described by the equations (2') and (3'):

$$l_x = L/3 + 2n_x L/(3(N_x-2)) \text{ for } n_x=0,1,2,\ldots(N_x/2-1); \text{ and}$$

$$l_x = L/3 + 2L(n_x - N_x/2)/(3N_x) \text{ for } n_x=(N_x/2),(N_x/2+1),\ldots N_x \quad (2')$$

$$l_y = L/3 + 2n_y L/(3(N_y-2)) \text{ for } n_y=0,1,2,\ldots(N_y/2-1); \text{ and}$$

$$l_y = L/3 + 2L(n_y - N_y/2)/(3N_y) \text{ for } n_y=(N_y/2),(N_y/2+1),\ldots N_y \quad (3')$$

Embodiments incorporating reticles with multiple chirps, such as the one described by equations (2') and (3'), are advantageous, because they can provide greater variation in aperture duty cycle as between adjacent cells. In this manner, it is easier for the coarse position measurement system to distinguish between immediately adjacent cells on the reticle. In order to implement an absolute position measurement encoder using a multiple chirp reticle, however, an additional piece of information is required, which relates to the chirp that the reticle presently occupies. This extra information can be obtained from a number of sources, including prior knowledge of the absolute position, the drive conditions imparted on an actuation system which is present to move an object and a prediction of the resultant movement of the reticle. In addition, external reference sources of radiation may be used to indicate which chirp the reticle presently occupies.

In the specific embodiments described by FIGS. 10 and 11, the layout of the reticle 30 has been shown as a two dimensional grid, but there are many alternative embodiments that would also produce the Moiré interference patterns envisioned by the present invention. One such embodiment involves a modified reticle pattern as shown in FIG. 17A, wherein the reticle 99 is made up of concentric circles of opaque material 98, rather than an orthogonal grid. The layout of the radiation banks (21-A, 21-B, 21-C and 21-D) remains as a series of orthogonal radiation stripes (see FIG. 10). It is easy to appreciate that this arrangement of radiation banks (21-A, 21-B, 21-C and 21-D) still generates a Moiré interference pattern when projected and imaged onto the circularly patterned reticle 99

A particular advantage in the embodiment of FIG. 17A is that the fiber measurement system becomes rotationally symmetric and it is no longer necessary to measure the angular rotation of the reticle 99 according to the method disclosed earlier.

The circularly oriented reticle 99 may also provide absolute positional information over two dimensions, since the modulation level of the various phases (A through L) remains dependent on the location at which the various phases (A through L) are imaged onto the surface of the reticle 99. In some positions, the images of the various phases (A through L) alone will not be determinative of the absolute position. In such a scenario, the controller may still be able to resolve the absolute position of the object based on prior knowledge of the absolute position, the drive conditions imparted on an actuation system and a prediction of the resultant movement of the reticle 99.

In the circularly symmetric embodiment of FIG. 17A, the contrast, for the control signal phases (A through L), between the lowest signal intensity and the highest signal level (i.e. the "modulation depth") may be less than the corresponding modulation depth of the preferred implementation, where both the reticle 30 and radiation stripes are oriented in orthogonal straight lines. It is possible, however, to compensate for the lower modulation depth of the phases by employing more (or higher intensity) RED's 11, so as to yield higher overall phase signal intensity and correspondingly higher signal to noise ratio at the photodetector 23.

Improved performance can be obtained from the circularly oriented reticle 99 when it is used in combination with a layout of radiation banks that is somewhat different than the radiation banks (21A, 21B, 21C, 21D) of FIG. 10. In the case of the reticle 99, it is advantageous to have the radiation banks and the corresponding RED's uniformly distributed on the mount so as to ensure that Moiré interference is produced for all positions at which the radiation banks are imaged onto the surface of the reticle 99. One such radiation bank 97 is shown in FIG. 17B. In FIG. 17B, the control signal RED's 11 are arranged in a grid pattern and the multiplexing circuitry is designed such that the RED's 11 can be pulsed to create radiation stripes 96-A that are oriented in the x-axis direction (i.e. rows of RED's 11) or radiation stripes 96-B oriented in the y-axis direction (i.e. columns of RED's 11). The radiation stripes may be time division multiplexed and pulsed in synchronization with the system clock, such that the phases can still be easily extracted by the photodetector 23. The layout of FIG. 17B is also effective in increasing the overall light level from the Moiré interference by simply increasing the number of control signal RED's 11 that are employed.

Referring back to the previously described embodiments in FIGS. 10 and 11, two radiation banks (21-A and 21-C) have radiation stripes oriented along the x-axis and are responsible for the measurement of the fine position on the y-axis. The two radiation banks (21-A and 21-C) will be referred to herein as the "y-axis radiation banks". Similarly, the radiation banks (21-B and 21-D) have radiation stripes oriented along the y-axis, are responsible for measuring the fine position on the x-axis, and are referred to herein as the "x-axis radiation banks".

Continuing to refer to the previously described embodiments of FIGS. 10 and 11, a difficulty associated with the previously described embodiments relates to undesirable cross-coupling of control signal modulation on the x and y axes. Ideally, radiation from the y-axis radiation banks (21-A and 21-C) would be impervious to movement of the reticle 30 along the x-axis. However, because of discrete RED radiation sources 11 and the variation in the size of adjacent apertures on the x-axis of the reticle 30, there is a small amount of modulation of the control signals from the y-axis radiation banks (21-A and 21-C) that results from the movement of the reticle 30 along the x-axis. Similarly, radiation from the x-axis radiation banks (21-B and 21-D) may be undesirably modulated by movement of the reticle 30 along the y-axis. This undesirable modulation is referred to as "coupling" or "cross-coupling" of the control signals on the x and y axes. In the previously described embodiments, the cross-coupling effect can be reduced by software algorithms contained in the controller code, that compensate the measured control signals. However, the cross-coupling of the control signals can also be physically removed by incorporating different embodiments of the radiation banks and the reticle.

In a first embodiment designed to eliminate the cross-coupling of the control signals from the fiber position measurement system, the control signal RED's 11 can be chosen to be different wavelengths for different radiation banks (21-A, 21-B, 21-C and 21-D) and the reticle can be made selectively permeable to these wavelengths. In this alternative embodiment, the y-axis radiation banks (21-A and 21-C) are selected to pulse control signal radiation at a particular wavelength and the x-axis radiation banks (21-B and 21-D) pulse control signal radiation at a second distinct wavelength. In addition, the embodiment employs a reticle similar to that of FIG. 11, but fabricated such that the reticle lines in the direction of the x-axis are made of a material that is opaque to only one of the control signal wavelengths, while the reticle lines in the direction of the y-axis are opaque to only the control signal wavelength. As will be described below, this embodiment decouples the measurement of the reticle position on the x-axis from the measurement of the reticle position on the y-axis and improves the signal to noise ratio of the position measurement system.

A convenient choice for the different wavelengths may be 940 nm and 830 nm, although it should be appreciated that many choices are available and the selection is based on availability of RED sources 11, the spectral response of the photodetector 23 and the availability of coating materials, which may be used to make the reticle lines that will selectively block one or the other wavelength.

Figure 18:
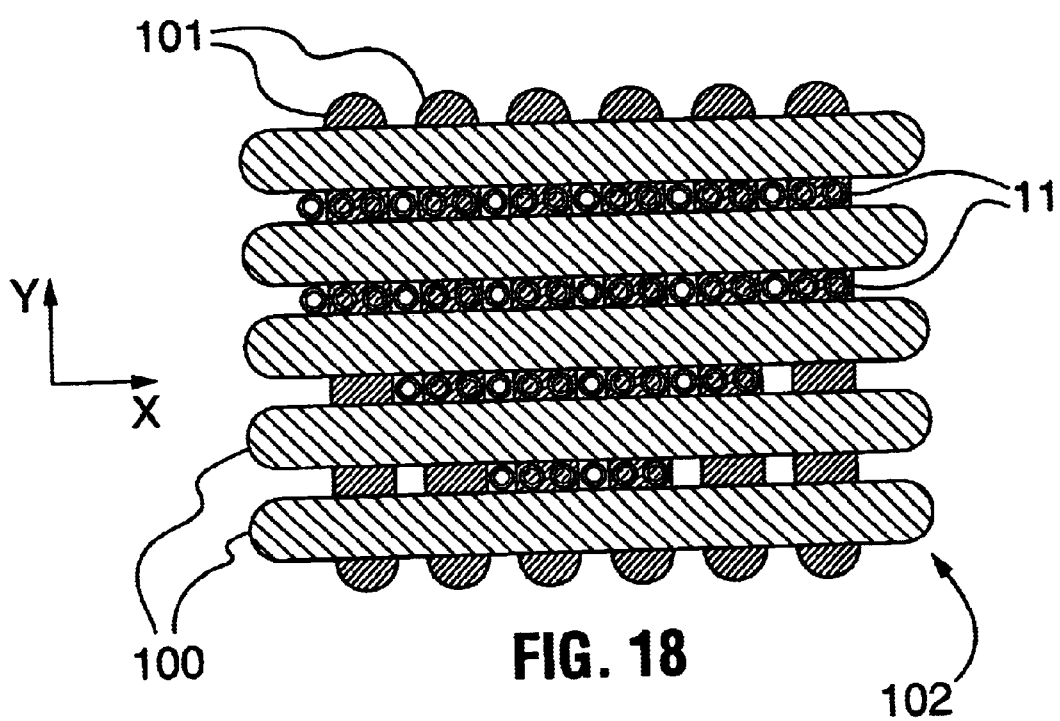
FIG. 18 depicts an alternative embodiment of the encoder utilizing a grid selectively sensitive to different wavelength radiation in the x and y axis.

The operation of the dual wavelength system can be explained with reference to FIG. 18. The image of a pattern of control signal RED's 11 from a particular y-axis radiation bank is shown superimposed over the reticle 102 as it would be if the RED's 11 were imaged onto the reticle 102 of a particular switching unit. For purposes of the discussion of this alternative embodiment, it is convenient to assume that the control signal RED's 11 of this particular y-axis radiation bank are chosen to have a wavelength of 940 nm. The reticle 102 is comprised of lines 100 oriented along the x-axis and lines 101 oriented along the y-axis. The lines 101 are opaque to radiation at 940 nm and transmit radiation at 830 nm, while the lines 100 are opaque to radiation at 830 nm and transmit radiation at 940 nm. FIG. 18 shows that the number of control signal RED's 11 that are transmitted by the reticle 102 to illuminate the photodetector 23 is increased considerably over the previously disclosed embodiments. This increase is a result of the transparency of lines 101 oriented on the y-axis to the radiation of the RED's 11 at λ=940 nm. In the previously disclosed embodiments, more radiation from the control signal RED's 11 was blocked by the opaque lines of the reticle 30 oriented on the y-axis. The increase in the number of detectable control signal RED's 11 for the dual wavelength embodiment represents a significant gain in the intensity of the control signals at the surface of the photodetector 23.

It should be understood that while the reticule 102 in FIG. 18 is shown with regularly spaced lines (100 and 101), it could also be fabricated with a variation in the aperture duty cycle. Such a fabrication could provide absolute positional information in a manner similar to that of the previously described embodiments.

As alluded to above, the arrangement of FIG. 18 has the added advantage that movements of the reticle 102 in the x and y directions will be decoupled from one another. Referring to FIG. 18 (and recalling the assumption that the RED's 11 therein depicted are at λ=940 nm), it can be seen that, because of the transparency of lines 101 to radiation at λ=940 nm, a movement of the reticle 102 along the x-axis direction has no effect on the control signal transmission. Similarly (although not shown), when RED's from an x-axis radiation bank are imaged onto the surface of the reticle 102, such control signal radiation will be impervious to movement of the reticle 120 in the y-axis direction. In this manner, the control signals from the x and y axes are physically decoupled from one another, without the need for the controller to employ software compensation schemes.

The fabrication of the dual wavelength reticle 102 may be achieved either by a two step lithography process or by fabricating the required lines on two separate substrates and bonding them together. It should be appreciated that there are many well known procedures in the art that can be employed to fabricate such a reticle 102.

In yet another variation of the previously described embodiments designed to decouple the x and y movements, different polarizations (rather than different wavelengths) can be utilized for each of the x-axis and y-axis radiation banks. In such an embodiment, the y-axis radiation banks (21-A and 21-C) can have a polarizing material placed in front of their RED's 11, which transmits only light of a single polarization to be projected onto the reticle. An orthogonally oriented polarizing material is placed in front of the x-axis radiation banks (21-B and 21-D), so as to transmit radiation of orthogonal polarity onto the reticle. In a manner similar to that of the dual wavelength reticle 102 (see FIG. 18), the reticle in the dual polarization embodiment is patterned with selectively transmitting lines of polarizing material that transmit certain polarities and block orthogonal polarities. In this manner, the control signals for the measurement of the x-axis and y-axis positions can be independently extracted without the undesirable coupling effect. This dual polarization embodiment allows the use of a single wavelength control signal RED 11.

It should be understood that the above descriptions of the simple and preferred embodiments are intended for illustrative purposes only, and are not intended to limit the scope of the present invention in any way. Those skilled in the art will appreciate that various modifications can be made to the embodiments discussed above without departing from the spirit of the present invention.

What is claimed is:

1. An encoder for determining an absolute position in two-dimensions, comprising:
   a) a surface patterned with a first pattern, said first pattern varying in a predetermined manner over said surface;
   b) a radiation source for emitting radiation having at least one second pattern;

c) means for projecting one or more images of radiation from said radiation source onto said surface for interaction therewith;

d) a radiation detection system operative to detect radiation which has interacted with said surface and to detect changes therein, said changes caused by relative motion between said surface and the one or more images of radiation from said radiation source; and e) a control system configured to determine an absolute position in two dimensions of the surface relative to said images of said radiation based on the detected changes in said radiation which has interacted with said surface and based on knowledge of the first and second patterns.

2. The encoder apparatus of claim 1 wherein said first pattern comprises a plurality of cells, each of which comprises a transmitting portion and a non-transmitting portion and wherein a ratio of an area of the transmitting portion to an area of the non-transmitting portion varies in a predetermined manner over the surface.

3. The encoder apparatus of claim 2 wherein said plurality of cells comprises a grid of lines, said lines varying in thickness across the surface in a first direction and in a second direction, orthogonal to said first direction, said lines disposed such that said plurality of cells have a constant pitch across the surface in both said first and said second direction.

4. The encoder apparatus of claim 3 wherein said grid of lines comprises a first plurality of lines extending in said first direction and a second plurality of lines extending in said second direction and wherein said first plurality of lines transmits a first wavelength of radiation and said second plurality of lines transmits a second wavelength of radiation.

5. The encoder apparatus of claim 1 wherein said first pattern comprises a series of concentric circles.

6. The encoder apparatus of claim 3 wherein said grid of lines comprises a first plurality of lines extending in said first direction and a second plurality of lines extending in said second direction and wherein said first plurality of lines transmits radiation of a first polarization and said second plurality of lines transmits radiation of a second polarization.

7. The encoder apparatus of claim 1 wherein said first pattern comprises a plurality of cells, each of which comprises a reflecting portion and a non-reflecting portion and wherein the ratio of an area of the reflecting portion to an area of the non-reflecting portion varies in a predetermined manner over the surface.

8. The encoder apparatus of claim 1 wherein said radiation source comprises a plurality of individual radiation sources.

9. The encoder apparatus of claim 8 wherein said individual radiation sources are radiation emitting diodes.

10. The encoder apparatus of claim 8 further comprising a means for switching individual ones of said plurality of individual radiation sources from an off-state to an on-state to generate said at least one second pattern.

11. The encoder apparatus of claim 10 wherein said means for switching further comprises means for changing said at least one second pattern with time in a predetermined sequence.

12. The encoder apparatus of claim 10 wherein said at least one second pattern comprises a second pattern which includes a first plurality of lines extending in a first direction and a second pattern which includes a second plurality of lines extending in a second direction orthogonal to the first direction.

13. The encoder apparatus of claim 8 wherein said means for projecting comprises an optical system operative to image said plurality of individual radiation sources onto said surface.

14. The encoder apparatus of claim 13 wherein said means for projecting comprises a focusing lens.

15. The encoder apparatus of claim 1 comprising at least one folding mirror interposed between said radiation source and said surface.

16. The encoder apparatus of claim 15 wherein said folding mirror is operative to move the one or more images of radiation from said radiation source relative to said surface.

17. The encoder apparatus of claim 16 wherein the folding mirror comprises one or more micro-electro-mechanical-systems type devices.

18. The encoder apparatus of claim 1 wherein said detection system comprises a photodetector.

19. The encoder apparatus of claim 1 wherein said detection system comprises a charge coupled device.

20. A two dimensional Moiré encoder system, comprising:

a) a plurality of surfaces, each surface comprising a first pattern which varies in a predetermined manner over said surface;

b) a radiation source for emitting radiation having at least one second pattern;

c) means for substantially simultaneously projecting one or more images of radiation from said radiation source onto each of said plurality of surfaces for interaction therewith;

d) a radiation detection system operative to separately detect radiation which has interacted with each of said surfaces and to produce a corresponding plurality of electronic signals;

e) a control system connected to determine a position in two dimensions for each surface based on: the plurality of electronic signals, the first pattern associated with each surface and the at least one second pattern; and f) at least one moveable element, wherein motion of said at least one moveable element creates relative motion between the one or more images of radiation from said radiation source and a corresponding one of said plurality of surfaces.

21. A method of implementing a two-dimensional encoder, the method comprising:

providing a radiation source which selectively emits radiation from a first plurality of lines extending in a first direction and from a second plurality of lines extending in a second direction orthogonal to the first direction;

generating Moiré interference patterns by imaging radiation from said radiation source onto a grid reticle said grid reticle comprising a series of lines which are spaced apart by a constant pitch relative to one another while varying in thickness in a predetermined manner.

22. The method of claim 21 wherein said radiation source comprises a plurality of individual radiation sources.

23. The method of claim 22 wherein generating Moiré interference patterns comprises individually activating said individual radiation sources.

24. A method of implementing a two dimensional encoder, the method comprising:

providing a radiation source comprising a plurality of radiation emitting devices capable of being addressed to create a pre-determined radiation pattern;

projecting said radiation pattern from said radiation source onto a reticle surface, said reticle surface comprising transmissive and non-transmissive portions positioned and sized to generate Moiré interference at said surface; and detecting said Moiré interference to determine relative motion between said surface and said radiation pattern projected onto said reticle surface.

25. A method of implementing a two dimensional encoder, the method comprising:
provingd a radiation source comprising a plurality of radiation emitting devices capable of being addressed to create a pre-determined radiation pattern;
projecting said radiation pattern onto a reticle surface, said reticle surface comprising reflective and non-reflective portions disposed to generate Moiré interference at said surface; and
detecting said Moiré interference to determine relative motion between said surface and said radiation pattern.

26. A system for determining a position of an object, the system comprising:
a reticle coupled to move with the object, the reticle having a spatially varying pattern of interaction with radiation incident on the reticle;
a pattern projector configured to project a first group comprising at least three distinct radiation patterns onto the reticle, the three distinct radiation patterns of the first group each comprising a plurality of elongated stripes extending generally parallel to a first axis; and
a radiation sensor associated with the reticle, the radiation sensor located to generate a sensor signal indicative of an intensity of radiation of each radiation pattern which has interacted with the reticle.

27. The system of claim 26, wherein the pattern projector is configured to project a second group comprising at least three distinct radiation patterns onto the reticle, the three distinct radiation patterns of the second group each comprising a plurality of elongated stripes extending generally parallel to a second axis.

28. The system of claim 27, wherein the first and second axes are orthogonal.

29. The system of claim 28, wherein the pattern projector is configured to project the radiation patterns of the first and second groups in a time multiplexed manner.

30. The system of claim 29 comprising a data processor, connected to receive the sensor signal, and a clock signal which provides information regarding the time multiplexing of the radiation patterns, wherein the data processor is configured to compute a position of the reticle based on the sensor and clock signals.

31. The system of claim 30, wherein the reticle is patterned with a regular array of cells.

32. The system of 31, wherein each of the cells comprises an aperture portion and an opaque portion and wherein the reticle passes a first proportion of radiation incident on the aperture portion from the pattern projector to the radiation sensor and the reticle passes a second proportion, smaller than the first proportion, of the radiation incident on the opaque portion from the pattern projector to the radiation sensor.

33. The system of claim 31, wherein the radiation patterns of the first and second groups each comprise a spatially periodic pattern having a period equal to a spatial periodicity of the cells.

34. The system of claim 33, wherein the cells are arranged in rows substantially parallel to the first axis and columns extending substantially parallel to the second axis.

35. The system of claim 27, wherein each radiation pattern of the first and second groups comprises a spatially periodic pattern.

36. The system of claim 27, wherein the radiation patterns of the first group are of a first wavelength, the radiation patterns of the second group are of a second wavelength different from the first wavelength and the radiation sensor is sensitive to both the first and second wavelengths.

37. The system of claim 27, wherein the pattern projector comprises an array of radiation emitting devices.

38. The system of claim 37, wherein the pattern projector is configured to project each of the patterns of the first and second groups by turning on a different plurality of the radiation emitting devices.

39. The system of claim 26, wherein the reticle has spatially varying transmissivity and the radiation sensor is located to detect radiation from the pattern projector which has passed through the reticle.

40. The system of claim 26, wherein the reticle has spatially varying reflectivity and the radiation sensor is located to detect radiation from the pattern projector which has been reflected from the reticle.

41. The system of claim 26, wherein the reticle comprises a circularly symmetrical pattern of aperture areas and opaque areas and wherein the reticle passes a first proportion of radiation incident on the aperture areas from the pattern projector to the radiation sensor and the reticle passes a second proportion, smaller than the first proportion, of the radiation incident on the opaque areas from the pattern projector to the radiation sensor.

42. An apparatus for determining a position in two dimensions comprising:
an optical element having optical properties which interact with incident radiation in a manner that varies according to a two-dimensional incidence position of the radiation on the element;
an imaging optical system which projects a plurality of radiation patterns onto the element; and
at least one radiation detector positioned to measure intensities of the plurality of radiation patterns after they interact with the element,
wherein the measured intensities of the plurality of radiation patterns may be used to determine a position of the element in two dimensions.

43. An apparatus according to claim 42, wherein the element comprises a reticle, which comprises a plurality of equally sized cells, each of which has an optically transmitting portion and an optically non-transmitting portion.

44. An apparatus according to claim 43, wherein the optical properties comprise a variation, between different cells of the reticle, of a ratio of an area of the optically transmitting portion of a cell to an area of the optically non-transmitting portion of the cell.

45. An apparatus according to claim 43, wherein the optically non-transmitting portions of the plurality of cells comprise a first plurality of non-transmitting regions that extend across the reticle in a first direction and a second plurality of optically non-transmitting regions that extend across the reticle in a second orthogonal direction.

46. An apparatus according to claim 45, wherein the optical properties comprise a variation, between different cells of the reticle, of an area of the first and second pluralities of optically non-transmitting regions.

47. An apparatus according to claim 42, wherein the element comprises a plurality of equally sized cells and each cell comprises an optically reflecting portion and an optically non-reflecting portion.

48. An apparatus according to claim 47, wherein the optical properties comprise a variation, between different cells of the element, of a ratio of an area of the optically reflective portion of a cell to an area of the optically non-reflective portion of the cell.

49. An apparatus according to claim 42, wherein the element comprises a plurality of concentric optically transmitting rings interleaved with a plurality of concentric optically non-transmitting rings.

50. An apparatus according to claim 42, wherein the element comprises a plurality of concentric optically reflecting rings interleaved with a plurality of concentric optically non-reflecting rings.

51. An apparatus according to claim 42, wherein the imaging optical system comprises at least one lens.

52. An apparatus according to claim 42, wherein the imaging optical system comprises at least one mirror.

53. An apparatus according to claim 52, wherein the element is static and the measured intensities of the plurality of radiation patterns may be used to determine a position of the mirror in two dimensions.

54. An apparatus according to claim 42, comprising a controller, which is connected to receive the measured intensities of the plurality of radiation patterns and is configured to determine therefrom the position of the element in two dimensions.

55. An apparatus according to claim 42, comprising a plurality of radiation sources, wherein each of the plurality of radiation patterns comprises radiation emitted from at least one of the radiation sources.

56. An apparatus according to claim 55, wherein the projection of the plurality of radiation patterns onto the element is multiplexed in time, such that only one individual radiation pattern is projected onto the element at a given time.

57. An apparatus according to claim 55, wherein each radiation source is imaged onto the element by the imaging optical system.

58. An apparatus according to claim 55, wherein each radiation source comprises a plurality of radiation emitting devices.

59. An apparatus according to claim 58, wherein the radiation emitting devices are radiation emitting diodes.

60. An apparatus according to claim 55, wherein each radiation source is selectively switchable from a radiation emitting on-state to a non-radiating off-state and the switching of each radiation source is multiplexed in time, such that only one radiation source emits radiation at any given time.

61. An apparatus according to claim 55, wherein the plurality of radiation sources comprises a first set of radiation sources and a second set of radiation sources, each of the first set of radiation sources comprising a spatially periodic plurality of radiation stripes that have an elongated shape in a first direction and a relatively narrow shape in a second orthogonal direction and each of the second set of radiation sources comprising a spatially periodic plurality of radiation stripes that have an elongated shape in the second orthogonal direction and a relatively narrow shape in the first direction.

62. An apparatus according to claim 61, wherein each radiation stripe comprises a plurality of radiation emitting devices.

63. An apparatus according to claim 55, wherein the element is static and the measured intensities of the plurality of radiation patterns may be used to determine a position of the plurality of radiation sources in two dimensions.

64. An apparatus according to claim 55, wherein the plurality of radiation sources comprises a first set of radiation sources having a first wavelength and a second set of radiation sources having a second wavelength.

65. An apparatus according to claim 64, wherein the element is a reticle comprising a first plurality of regions that extend across the reticle in a first direction and a second plurality of regions that extend across the reticle in a second orthogonal direction.

66. An apparatus according to claim 65, wherein the first plurality of regions is optically transmitting at the first wavelength, but substantially non-transmitting at the second wavelength, and the second plurality of regions is optically transmitting at the second wavelength, but substantially non-transmitting at the first wavelength.

67. An apparatus according to claim 66, wherein each of the first plurality of regions varies in cross-section as it extends across the reticle in the first direction and each of the second plurality of regions varies in cross-section as it extends across the reticle in the second orthogonal direction.

68. An apparatus according to claim 55, wherein the plurality of radiation sources comprises a first set of radiation sources that are polarized in a first polarization direction and a second set of radiation sources that are polarized in a second orthogonal polarization direction.

69. An apparatus according to claim 68, wherein the element is a reticle comprising a first plurality of regions that extend across the reticle in a first direction and a second plurality of regions that extend across the reticle in a second orthogonal direction.

70. An apparatus according to claim 69, wherein the first plurality of regions transmits radiation having the first polarization direction, but substantially blocks radiation having the second polarization direction, and the second plurality of regions transmits radiation having the second orthogonal polarization direction, but substantially blocks radiation having the first polarization direction.

71. An apparatus according to claim 70, wherein each of the first plurality of regions varies in cross-section as it extends across the reticle in the first direction and each of the second plurality of regions varies in cross-section as it extends across the reticle in the second orthogonal direction.

72. An apparatus for determining a position in two dimensions, comprising:
   a plurality of radiation sources which emit a corresponding plurality of radiation beams;
   an optical element comprising optical properties which interact with incident radiation in a manner that depends on a two-dimensional incidence position of the radiation on the element;
   an imaging optical system interposed between the plurality of radiation sources and the element, so as to direct the plurality of radiation beams toward the element and to create images of the plurality of radiation sources on the element;
   at least one radiation detector capable of measuring intensities of the plurality of radiation beams after they interact with the element; and
   a controller connected to receive the measured intensities of the plurality of radiation beams and to use the measured intensities of the plurality of radiation beams to determine a position of the element in two dimensions.

73. A method of determining a two-dimensional position comprising:
   providing an optical element having optical properties which interact with incident radiation in a manner that varies according to a two-dimensional incidence position of the radiation on the element; projecting a plurality of radiation patterns onto the element;
   measuring intensities of the plurality of radiation patterns after they interact with the element; and
   determining a position of the element in two dimensions based on the measured intensities of the plurality of radiation patterns.

74. A method according to claim 73, wherein projecting a plurality of radiation patterns onto the element comprises imaging a plurality of radiation sources onto the element, each of the radiation sources corresponding with one of the plurality of radiation patterns.

75. A method according to claim 74, wherein projecting a plurality of radiation patterns onto the element comprises projecting individual radiation patterns onto the element and multiplexing the projections of the individual radiation patterns in time.

76. A method according to claim 75, wherein multiplexing the projections of the individual radiation patterns in time comprises, for each radiation pattern, selectively switching the corresponding radiation source between a radiation emitting on-state and a non-radiating off-state.

77. A method according to claim 74, wherein imaging a plurality of radiation sources onto the element comprises reflecting radiation emitted by the plurality of radiation sources using a mirror.

78. A method according to claim 74 comprising determining a two-dimensional position of an object by fixing the object to the element, such that the two-dimensional position of the object is determined by the two-dimensional position of the element.

79. A method according to claim 78 comprising controlling movement of the object to a desired two-dimensional position, wherein controlling movement of the object comprises:
    calculating one or more actuator signals based, at least in part, on a difference between the two-dimensional position of the object and the desired two-dimensional position;
    applying the one or more actuator signals to actuators to adjust the position of the object.

80. A method according to claim 73, wherein providing an optical element comprises providing a reticle, the reticle comprising a plurality of equally sized cells, each of which has an optically transmitting portion and an optically non-transmitting portion and wherein the optical properties comprise a variation, between different cells of the reticle, of a ratio of an area of the optically transmitting portion of a cell to an area of the optically non-transmitting portion of the cell.

81. A method according to claim 80, wherein measuring intensities of the plurality of radiation patterns comprises measuring the intensities of the radiation patterns transmitted by the reticle.

82. A method according to claim 80, wherein determining a position of the element in two dimensions comprises:
    determining a coarse position of the element to within an area of a particular cell; and
    determining a fine position of the element inside the particular cell.

83. A method of determining a two-dimensional position comprising:
    providing an optical element, which comprises at least one first optical feature that is spatially periodic in a first direction and at least one second optical feature that is spatially periodic in a second orthogonal direction;
    generating Moiré interference by projecting a plurality of radiation patterns onto the element, such that when projected onto the element, each radiation pattern is spatially periodic in at least one of: the first direction and the second orthogonal direction;
    measuring aspects of the Moiré interference produced by each radiation pattern; and
    determining a position of the element in two dimensions using the measured aspects of the Moiré interference.

84. A method according to claim 83, wherein the first and second optical features comprise one of: an edge of a transmitting region, an edge of a non-transmitting region, an edge of a reflecting region and an edge of a non-reflecting region.

85. A method according to claim 83, wherein generating Moiré interference by projecting a plurality of radiation patterns onto the element comprises projecting individual radiation patterns onto the element and multiplexing the projection of the individual radiation patterns in time.

86. A method according to claim 83, wherein measuring aspects of the Moiré interference produced by each radiation pattern comprises measuring an intensity of the Moiré interference produced by each radiation pattern.

87. A method according to claim 86, wherein generating Moiré interference by projecting a plurality of radiation patterns onto the element comprises:
    generating a Moiré interference pattern in the first direction by projecting at least one radiation pattern that, when projected onto the element, is spatially periodic in the first direction; and
    generating a Moiré interference pattern in the second orthogonal direction by projecting at least one radiation pattern that, when projected onto the element, is spatially periodic in the second orthogonal direction.

88. A method according to claims 87, wherein generating the Moiré interference pattern in the first direction comprises projecting at least one radiation pattern that, when projected onto the element, comprises a plurality of radiation stripes that are elongated in the second orthogonal direction and are relatively narrow in the first direction.

89. A method according to claim 87, wherein generating the Moiré interference pattern in the second orthogonal direction comprises projecting at least one radiation pattern that, when projected onto the element, comprises a plurality of radiation stripes that are elongated in the first direction and are relatively narrow in the second orthogonal direction.

90. A method according to claim 87, wherein measuring aspects of the Moiré interference comprises independently measuring intensities of the Moiré interference pattern in the first direction and the Moiré interference pattern in the second orthogonal direction.

91. A method according to claim 90, wherein determining a position of the element in two dimensions comprises determining a position of the element in the first direction using the measured intensity of the Moiré interference pattern in the first direction and determining a position of the element in the second orthogonal direction using the measured intensity of the Moiré interference pattern in the second orthogonal direction.

92. An apparatus for determining a position in two dimensions, comprising:
    an optical element, which comprises at least one first optical feature that is spatially periodic in a first direction and at least one second optical feature that is spatially periodic in a second orthogonal direction;
    a plurality of individually addressable radiation sources, each of which is spatially periodic in at least one of: the first direction and the second orthogonal direction;
    an imaging optical system interposed between the plurality of radiation sources and the element, so as to image the plurality of radiation sources onto the element in a manner that generates Moiré interference;
    a radiation detector positioned to measure aspects of the Moiré interference; and
    a controller connected to receive the measured aspects of the Moiré interference and determine therefrom a position of the element in two dimensions.

* * * * *